United States Patent
McKenzie et al.

(10) Patent No.: US 10,275,023 B2
(45) Date of Patent: Apr. 30, 2019

(54) COMBINING GAZE INPUT AND TOUCH SURFACE INPUT FOR USER INTERFACES IN AUGMENTED AND/OR VIRTUAL REALITY

(71) Applicant: Google Inc., Mountain View, CA (US)

(72) Inventors: Chris McKenzie, San Francisco, CA (US); Chun Yat Frank Li, Mountain View, CA (US); Hayes S. Raffle, Palo Alto, CA (US)

(73) Assignee: GOOGLE LLC, Mountain View, CA (US)

(*) Notice: Subject to any disclaimer, the term of this patent is extended or adjusted under 35 U.S.C. 154(b) by 247 days.

(21) Appl. No.: 15/386,594

(22) Filed: Dec. 21, 2016

(65) Prior Publication Data
US 2017/0322623 A1   Nov. 9, 2017

Related U.S. Application Data

(60) Provisional application No. 62/332,311, filed on May 5, 2016.

(51) Int. Cl.
| | |
|---|---|
| *G06F 3/01* | (2006.01) |
| *G06F 3/023* | (2006.01) |
| *G06F 3/0482* | (2013.01) |
| *G06F 3/0488* | (2013.01) |
| *G06F 3/038* | (2013.01) |

(Continued)

(52) U.S. Cl.
CPC .............. *G06F 3/013* (2013.01); *G06F 3/011* (2013.01); *G06F 3/017* (2013.01); *G06F 3/0236* (2013.01); *G06F 3/038* (2013.01); *G06F 3/0346* (2013.01); *G06F 3/0482* (2013.01); *G06F 3/0488* (2013.01); *G06F 3/04842* (2013.01); *G06F 3/04883* (2013.01); *G06F 3/04886* (2013.01);

(Continued)

(58) Field of Classification Search
CPC ........................................................ G06F 3/013
USPC ........................................................ 715/773
See application file for complete search history.

(56) References Cited

U.S. PATENT DOCUMENTS

| | | |
|---|---|---|
| 3,986,030 A | 10/1976 | Teltscher et al. |
| 8,488,246 B2 | 7/2013 | Border et al. |

(Continued)

OTHER PUBLICATIONS

International Search Report and Written Opinion for PCT Application No. PCT/US2016/068257, dated Mar. 17, 2017, 17 pages.

*Primary Examiner* — William D Titcomb
(74) *Attorney, Agent, or Firm* — Brake Hughes Bellermann LLP

(57) ABSTRACT

In a virtual reality system, an optical tracking device may detect and track a user's eye gaze direction and/or movement, and/or sensors may detect and track a user's head gaze direction and/or movement, relative to virtual user interfaces displayed in a virtual environment. A processor may process the detected gaze direction and/or movement as a user input, and may translate the user input into a corresponding interaction in the virtual environment. Gaze directed swipes on a virtual keyboard displayed in the virtual environment may be detected and tracked, and translated into a corresponding text input, either alone or together with user input(s) received by the controller. The user may also interact with other types of virtual interfaces in the virtual environment using gaze direction and movement to provide an input, either alone or together with a controller input.

19 Claims, 29 Drawing Sheets

(51) Int. Cl.
  *G06F 3/0346* (2013.01)
  *G06F 3/0484* (2013.01)
  *G06T 19/00* (2011.01)
(52) U.S. Cl.
  CPC .... *G06F 2203/0381* (2013.01); *G06T 19/006* (2013.01)

(56) References Cited

U.S. PATENT DOCUMENTS

| | | | |
|---|---|---|---|
| 8,982,160 B2 | 3/2015 | Huang et al. | |
| 9,041,741 B2* | 5/2015 | Mabbutt | G06T 19/006 345/633 |
| 9,223,134 B2 | 12/2015 | Miller et al. | |
| 9,285,872 B1* | 3/2016 | Raffle | G06F 3/012 |
| 9,658,453 B1* | 5/2017 | Kress | G02B 27/0172 |
| 9,728,006 B2* | 8/2017 | Varga | G06T 19/006 |
| 2007/0040799 A1* | 2/2007 | Singh | G06F 3/013 345/156 |
| 2009/0196460 A1* | 8/2009 | Jakobs | G06F 3/013 382/103 |
| 2011/0225536 A1 | 9/2011 | Shams et al. | |
| 2011/0254865 A1* | 10/2011 | Yee | G06F 3/013 345/661 |
| 2012/0019662 A1 | 1/2012 | Maltz et al. | |
| 2012/0086645 A1 | 4/2012 | Zheng et al. | |
| 2012/0290401 A1* | 11/2012 | Neven | A61B 3/113 705/14.68 |
| 2014/0002341 A1* | 1/2014 | Nister | G06F 3/013 345/156 |
| 2014/0092018 A1* | 4/2014 | Geithner | G06F 3/013 345/160 |
| 2014/0320397 A1* | 10/2014 | Hennessey | A61B 3/113 345/156 |
| 2015/0130740 A1 | 5/2015 | Cederlund et al. | |
| 2015/0205437 A1* | 7/2015 | Takahashi | G06F 3/0418 345/178 |
| 2015/0268821 A1 | 9/2015 | Rambsy et al. | |
| 2015/0323990 A1* | 11/2015 | Maltz | G02B 27/0179 345/173 |
| 2016/0004306 A1* | 1/2016 | Maltz | G06F 3/013 345/173 |
| 2016/0062458 A1 | 3/2016 | Kristensson et al. | |
| 2016/0188181 A1* | 6/2016 | Smith | G06F 3/048 715/765 |
| 2017/0103680 A1* | 4/2017 | Campbell | G06F 3/167 |
| 2017/0104866 A1* | 4/2017 | Campbell | G06F 3/167 |
| 2017/0123492 A1* | 5/2017 | Marggraff | G06F 3/0236 |
| 2017/0285737 A1* | 10/2017 | Khalid | G06F 3/013 |

* cited by examiner

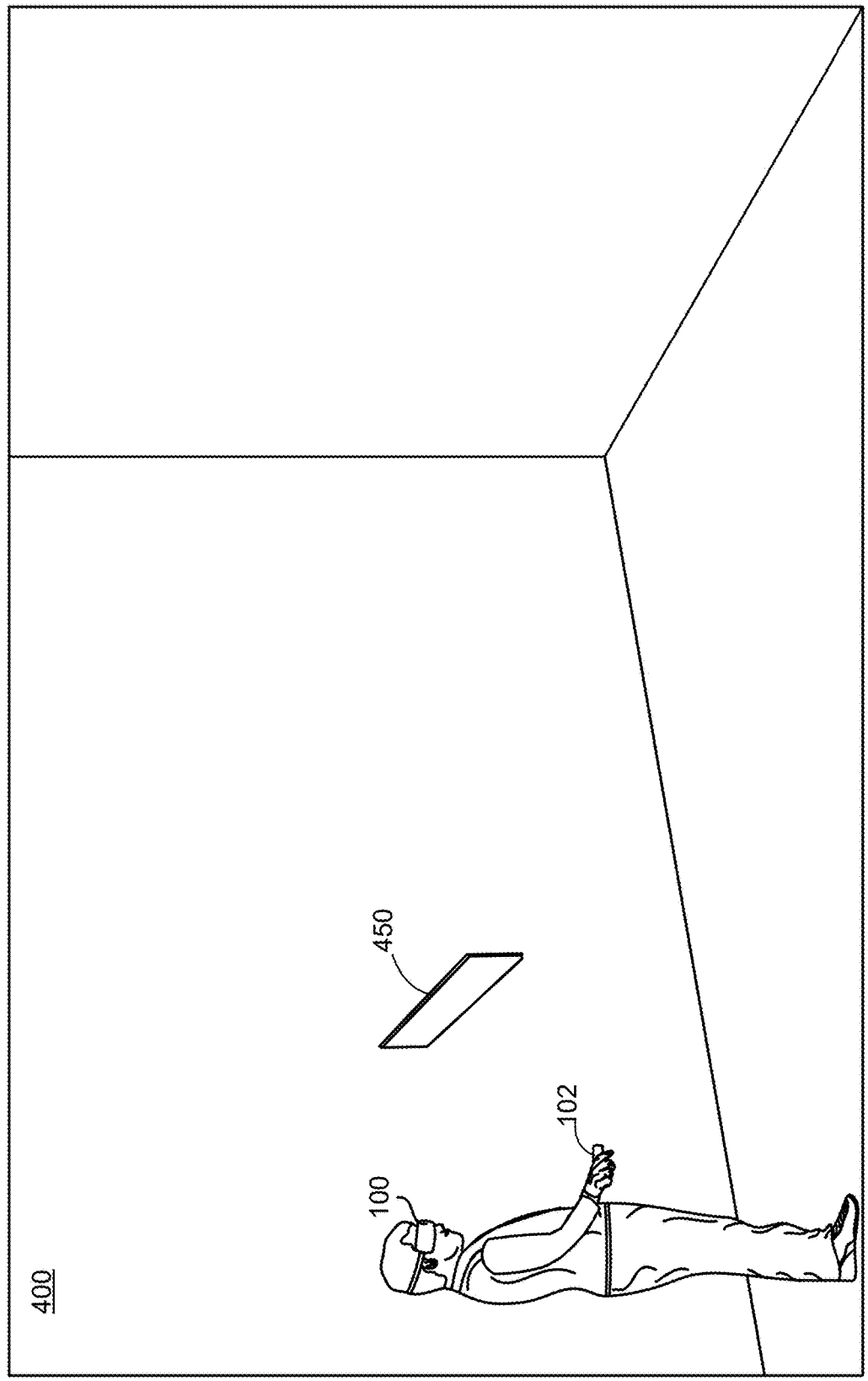

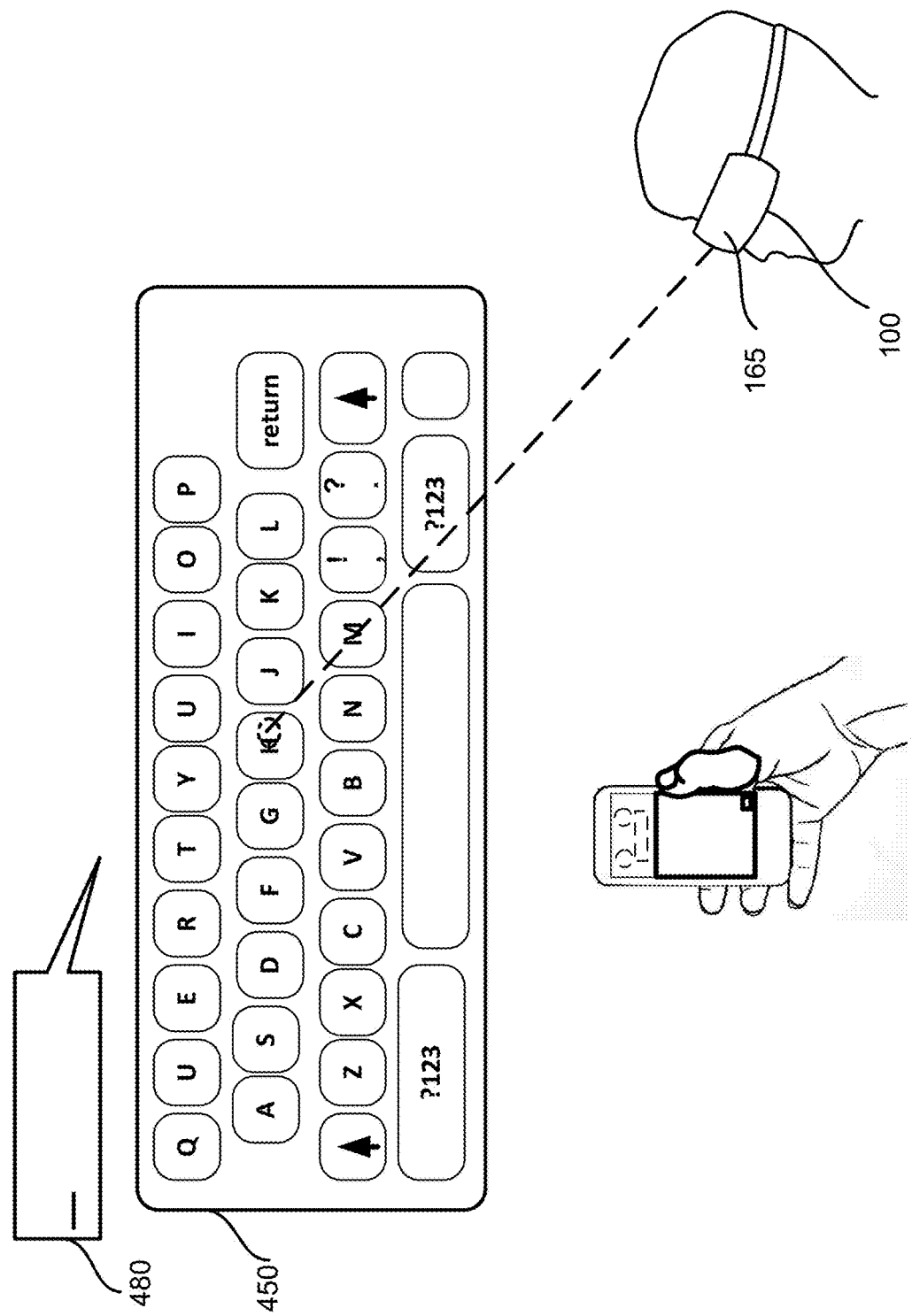

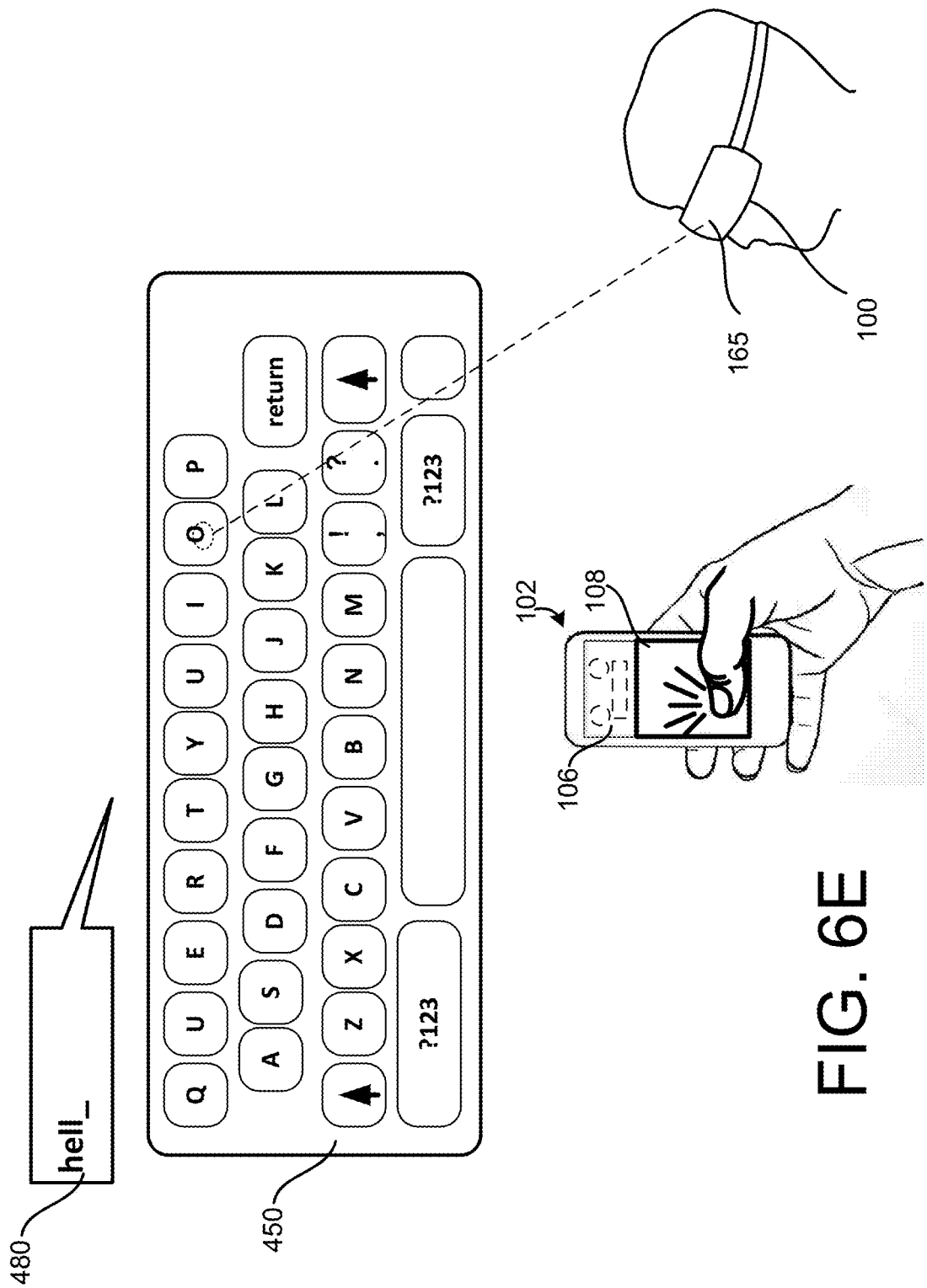

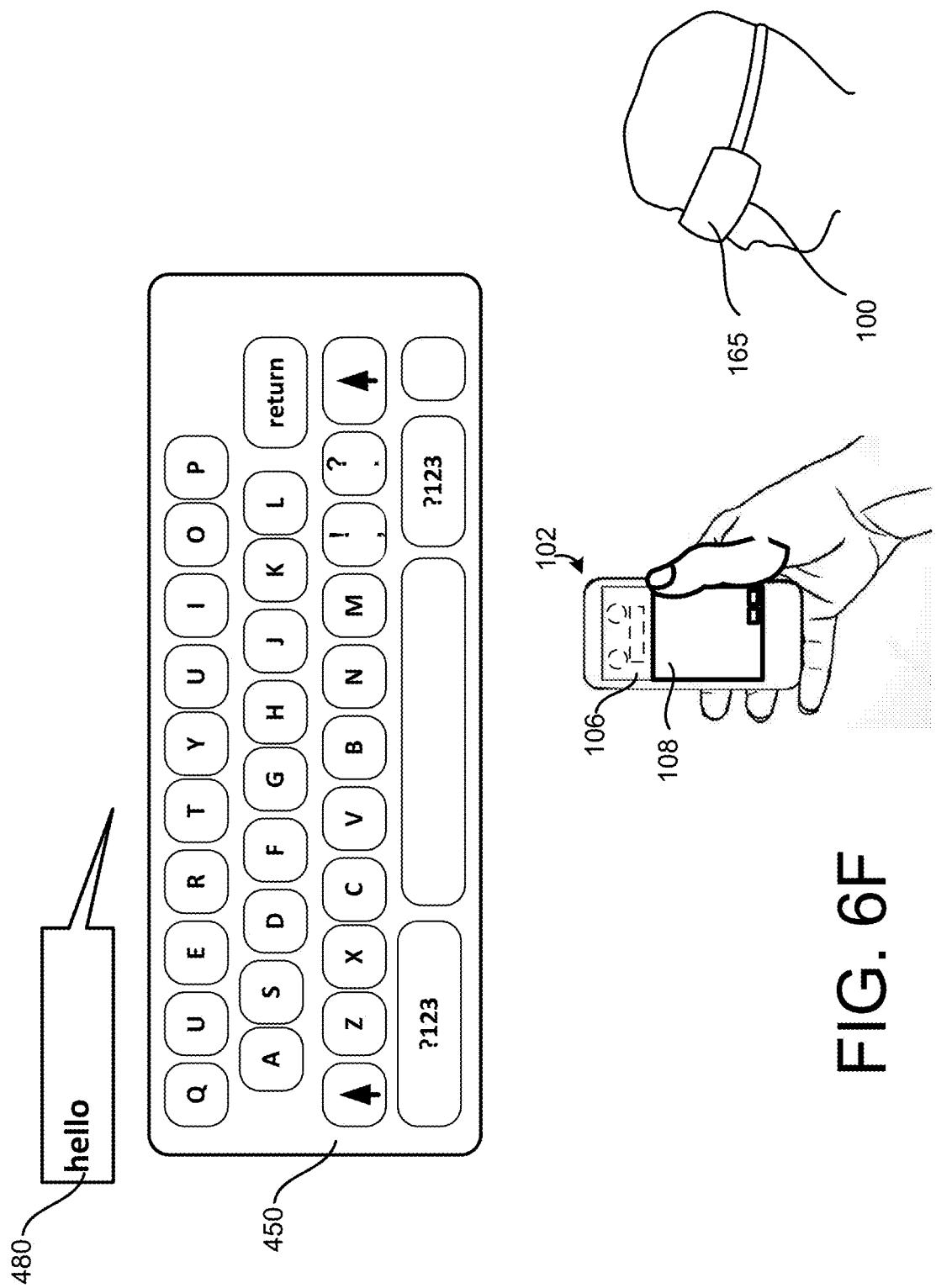

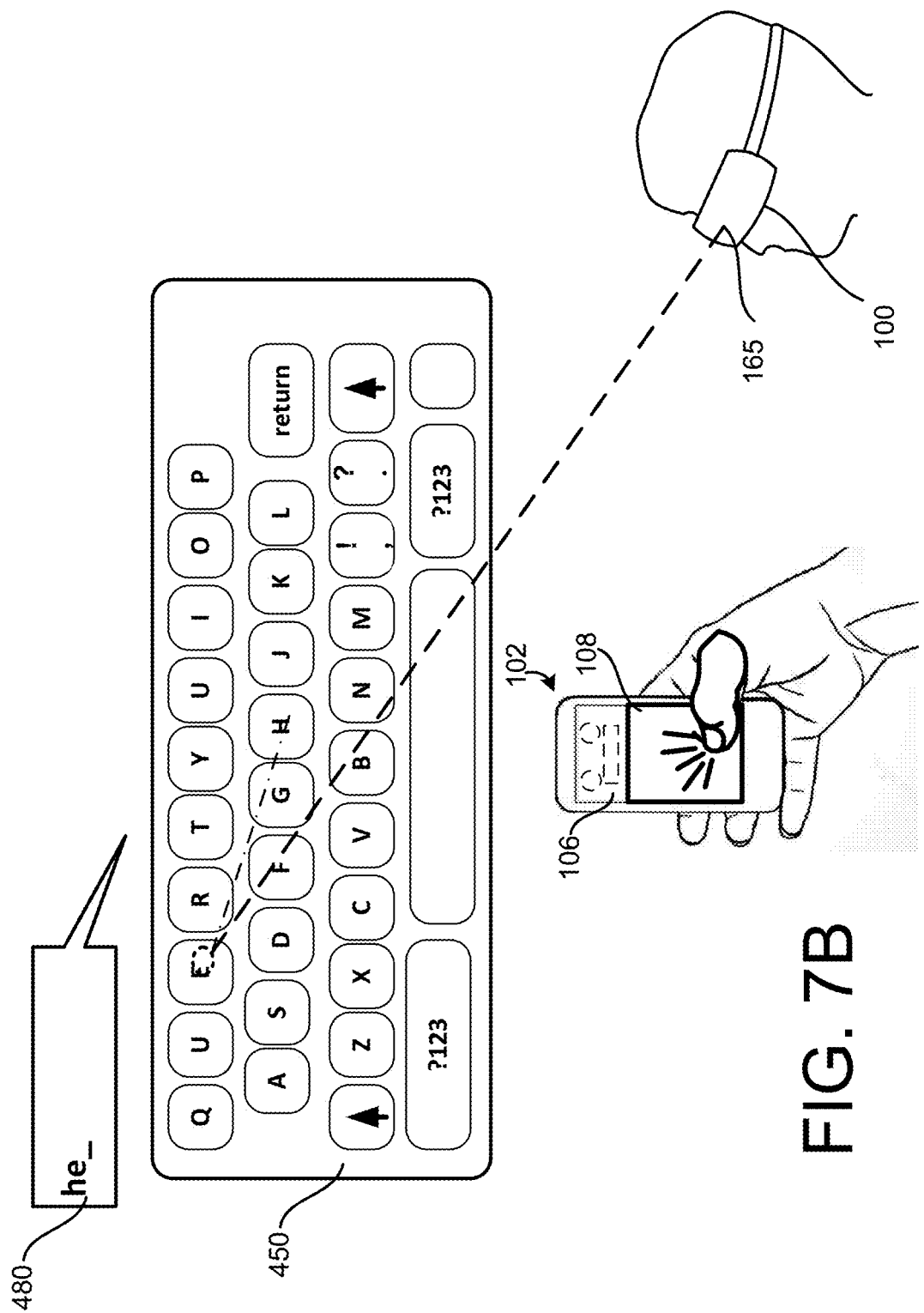

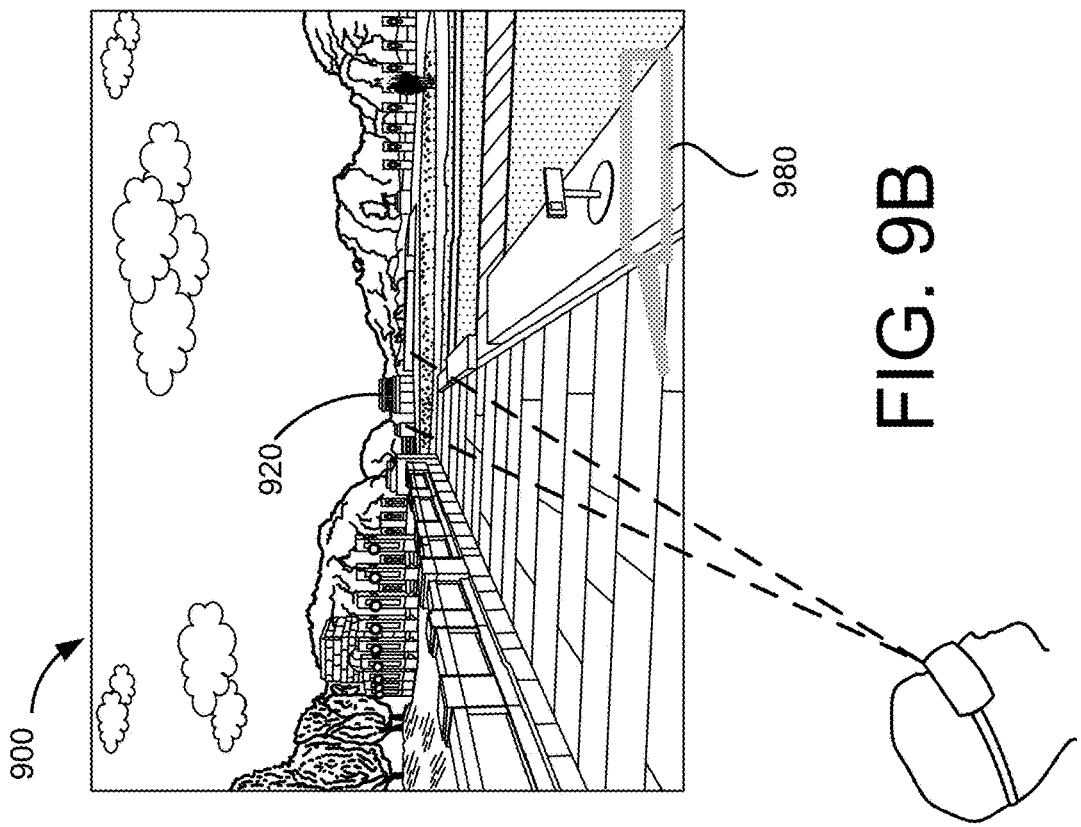
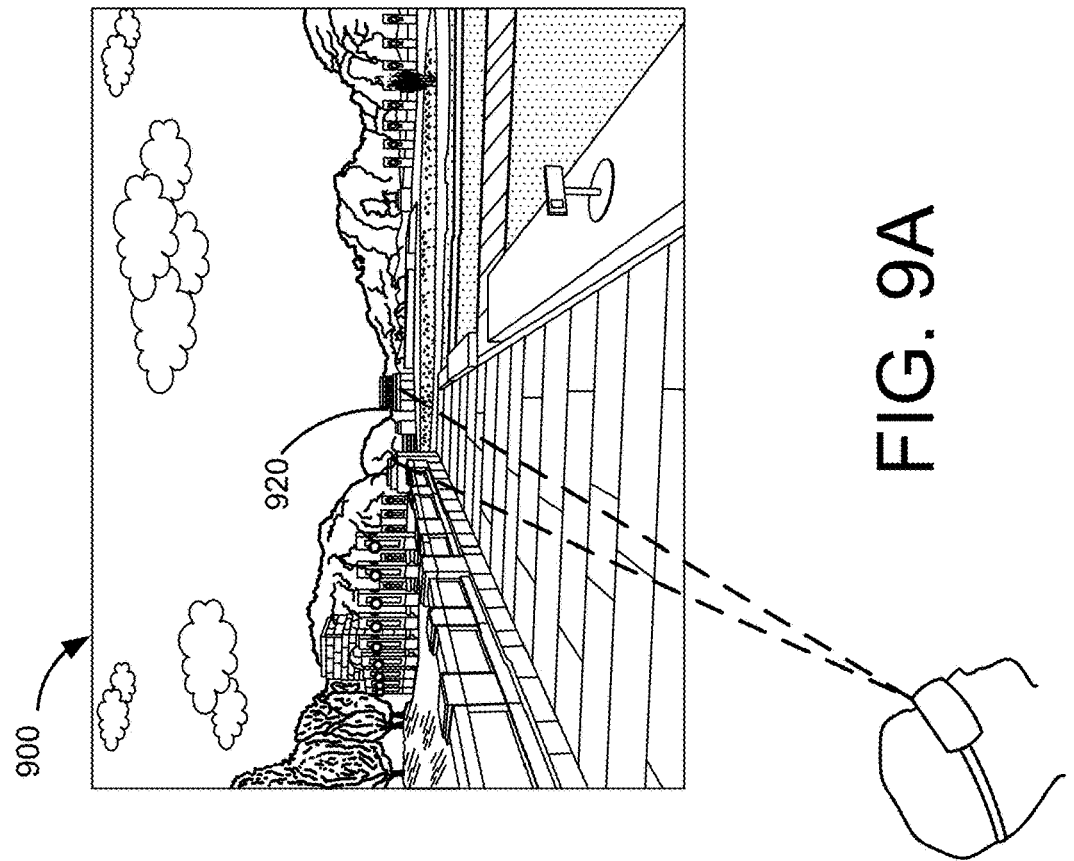

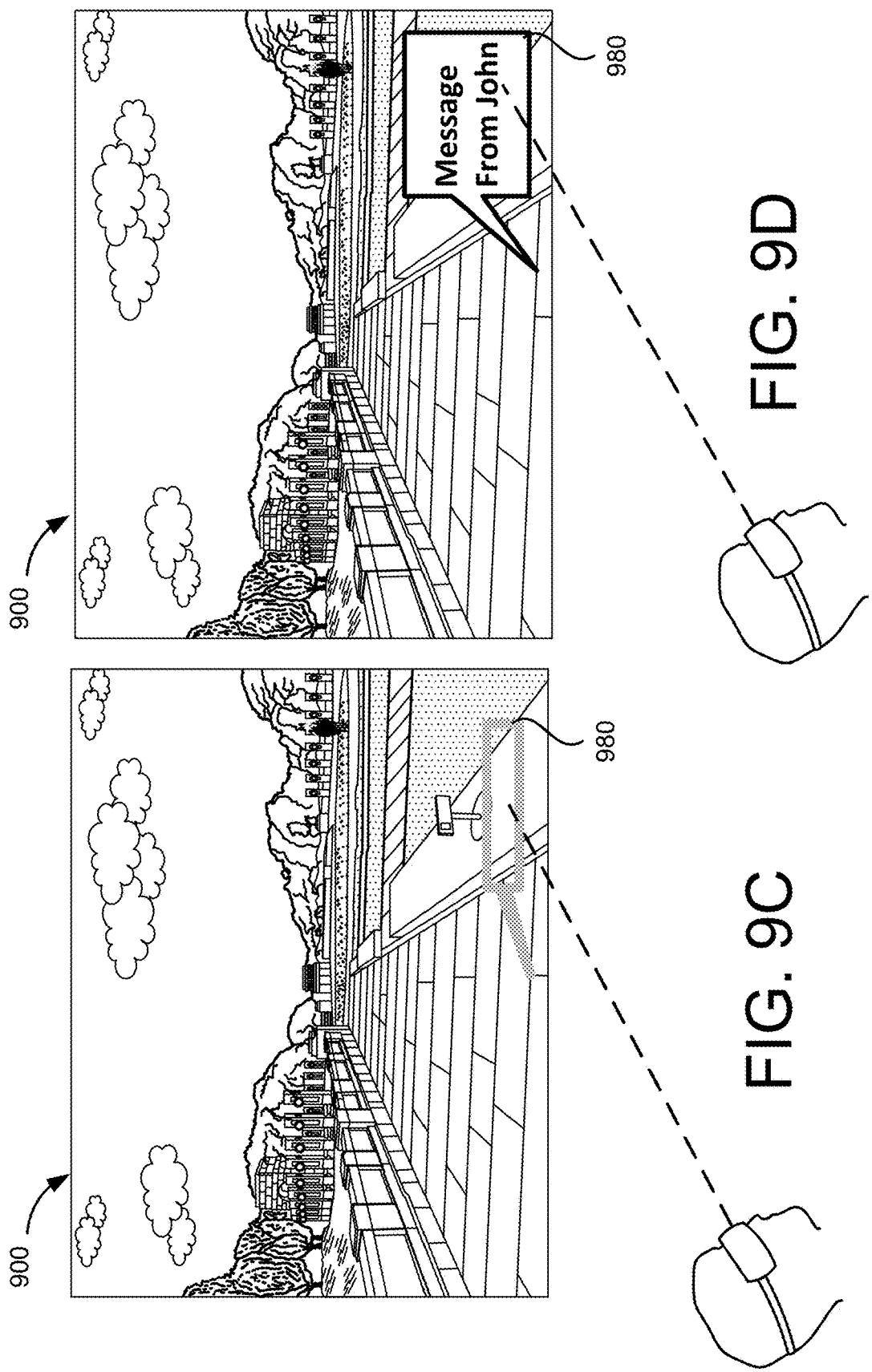

COMBINING GAZE INPUT AND TOUCH SURFACE INPUT FOR USER INTERFACES IN AUGMENTED AND/OR VIRTUAL REALITY

CROSS REFERENCE TO RELATED APPLICATION(S)

This application is a Non-Provisional of, and claims priority to, U.S. Provisional Application No. 62/332,311, filed on May 5, 2016, which is incorporated by reference herein in its entirety.

FIELD

This document relates, generally, to gaze input in an augmented reality and/or a virtual reality environment.

BACKGROUND

An augmented reality (AR) and/or virtual reality (VR) system may generate a three-dimensional (3D) immersive environment. A user may experience this 3D virtual immersive environment through interaction with various electronic devices, such as, for example, a helmet or other head mounted device including a display, glasses or goggles that a user looks through when viewing a display device, gloves fitted with sensors, external handheld devices that include sensors, and other such electronic devices. Once immersed in the virtual environment, the user may move through the virtual environment, and may interact with objects and features in the virtual environment using various different input methods.

SUMMARY

In one aspect, a computer-implemented method may include displaying, in a virtual reality environment, a virtual keyboard, detecting an initial eye gaze directed at an initial key of a plurality of keys of the virtual keyboard, receiving an initial input at a controller, initializing an eye gaze input mode in response to the initial input from the controller and the detection of the initial eye gaze, receiving at least one character input in response to at least one of a detected eye gaze input or a detected manipulation of the controller, and displaying, in the virtual reality environment, a character entry in response to the received at least one character input.

In another aspect, a computer program product embodied on a non-transitory computer readable medium, the computer readable medium having stored thereon a sequence of instructions which, when executed by a processor, may cause the processor to execute a method. The method may include displaying, in a virtual reality environment, a virtual keyboard, detecting an initial eye gaze directed at an initial key of a plurality of keys of the virtual keyboard, receiving an initial input at a controller, initializing an eye gaze input mode in response to the initial input from the controller and the detection of the initial eye gaze, receiving at least one character input in response to at least one of a detected eye gaze input or a detected manipulation of the controller, and displaying, in the virtual reality environment, a character entry in response to the received at least one character input.

The details of one or more implementations are set forth in the accompanying drawings and the description below. Other features will be apparent from the description and drawings, and from the claims.

BRIEF DESCRIPTION OF THE DRAWINGS

FIGS. 4A-4B illustrate a system for combining eye gaze and touch surface input in an augmented and/or virtual reality environment, in accordance with implementations as described herein.

FIGS. 5A-5G, 6A-6F, and 7A-7E illustrate systems for text entry in augmented and/or virtual reality environments, in accordance with implementations as described herein.

FIGS. 9A-9H illustrate systems for eye gaze interaction with user interfaces in an augmented and/or virtual reality environment, in accordance with implementations as described herein.

DETAILED DESCRIPTION

Figure 1:
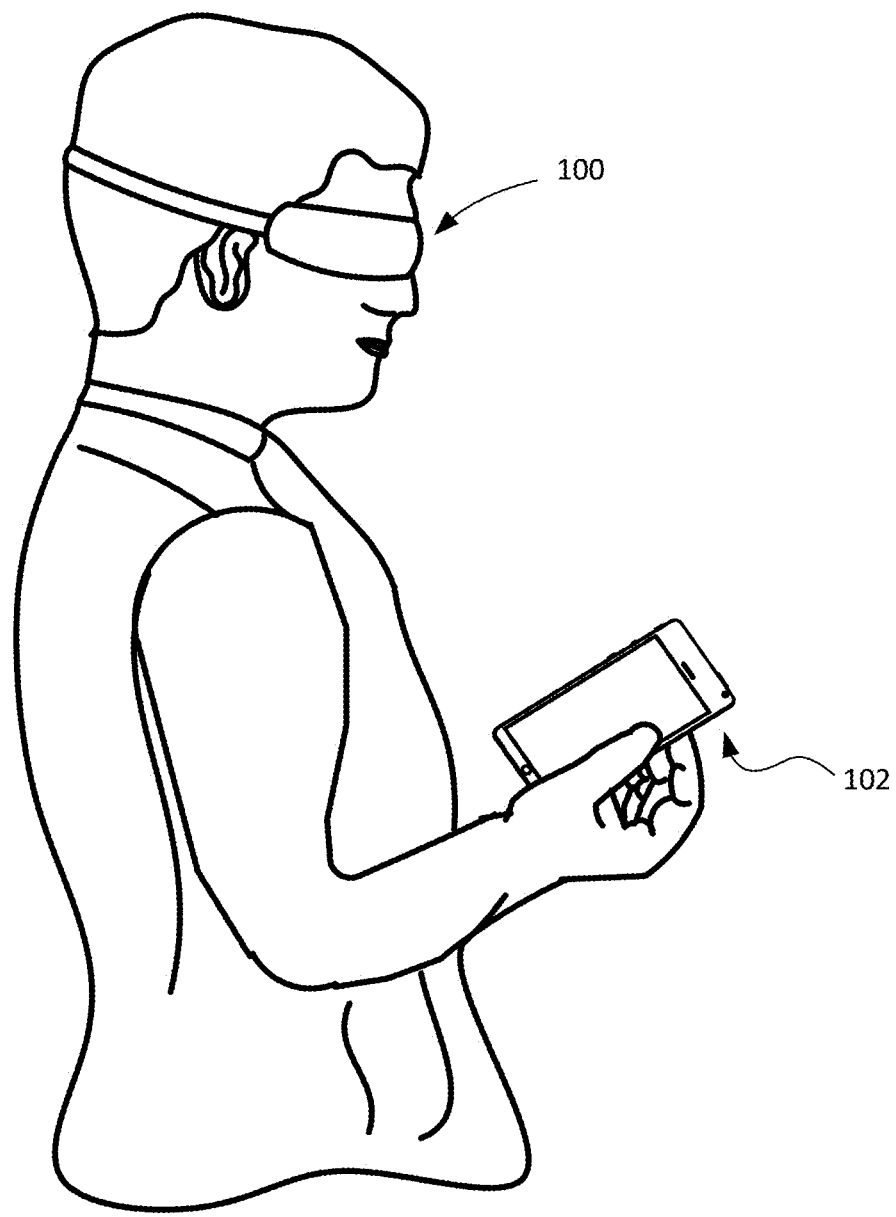
FIG. 1 is an example implementation of a virtual reality system including a head mounted display device and a handheld electronic device, in accordance with implementations as described herein.

A user immersed in a virtual environment wearing, for example, a head mounted display (HMD) device may explore the virtual environment and interact with the virtual environment through various different types of inputs including, for example, manipulation of one or more electronic devices separate from the HMD and/or manipulation of the HMD itself, and/or eye directional gaze, and/or head movement and/or hand/arm gestures, and the like. The user may manipulate one or more external devices such as, for example, external computing device(s), handheld electronic device(s), or controller(s), together with the HMD, to cause a desired action in the virtual environment. In some situations, because a display of the HMD is displaying the virtual immersive experience and/or one or more virtual objects, it may be difficult for the user to provide some types of inputs on the handheld electronic device, or controller, alone, as the handheld electronic device may not be readily visible to the user while wearing the HMD. For example, it may be difficult for a user to make a text entry using a keyboard on the handheld electronic device without being able to actually see the keyboard displayed on the handheld electronic device and/or a finger position relative to the displayed keyboard. Similarly, it may be difficult for the user to input, for example, a text entry using only inputs on a touch surface of the handheld electronic device while viewing a virtual keyboard displayed by the HMD in the virtual environment.

In a system and method, in accordance with implementations as described herein, a gaze tracking device may detect and/or track a gaze direction and/or movement of the user defining a gaze gesture. In some implementations, the gaze tracking device may be included in a head mounted display (HMD) device worn by the user, and a head gaze direction and/or movement of the user defining the gaze gesture may be detected and/or tracked by, for example, sensors included in the HMD and/or other sensors included in the system, so that the detected head gaze direction and/or movement defining the gaze gesture may be translated into a user input in the virtual environment generated by the HMD. In some implementations, the gaze tracking device may include an optical tracking device, for example, an optical gaze tracking device included in the HMD to detect and/or track the user's eye gaze direction and/or movement, defining a gaze gesture, so that the eye gaze direction and/or movement defining the gaze gesture may be translated into a user input in the virtual environment generated by the HMD. This detected and/or tracked gaze direction and gaze movement corresponding to the gaze gesture may be translated into, for example, a swiping input on a virtual user interface, such as, for example, a virtual keyboard displayed in the virtual environment by the HMD, to facilitate text entry in the virtual environment. In some situations, this may be implemented as a hybrid input system, in which this type of gaze input may be coupled with one or more user inputs via a handheld electronic device, or controller, and in particular, a touch sensitive surface of such a controller, to facilitate text entry inputs, and improve input accuracy.

In the example implementation shown in FIG. 1, a user wearing an HMD 100 is holding a portable handheld electronic device 102, or controller 102, that may be operably coupled with, and communicate with, the HMD 100 via, for example, a wired connection, or a wireless connection such as, for example, a WiFi or Bluetooth connection. This may provide for communication between and the exchange of data between the handheld electronic device 102 and the HMD 100, allowing the handheld electronic device 102 to function as a controller in communication with the HMD 100 for interacting in the virtual environment generated by the HMD 100. That is, a manipulation of the handheld electronic device 102, such as, for example, an input received on a touch surface of the handheld electronic device 102, a movement of the handheld electronic device 102, and the like may be translated into a corresponding interaction in the virtual environment generated by the HMD 100. The handheld electronic device 102 is just one example of an external computing device which may be operably coupled with the HMD 100, and which may receive user inputs related to user interaction in the virtual environment generated by the HMD 100. While the handheld electronic device 102 is presented herein for exemplary purposes, the principles to be described herein may be applied in a system including other types of external computing devices operably coupled to the HMD 100 and/or other components of the system.

Figure 2A:
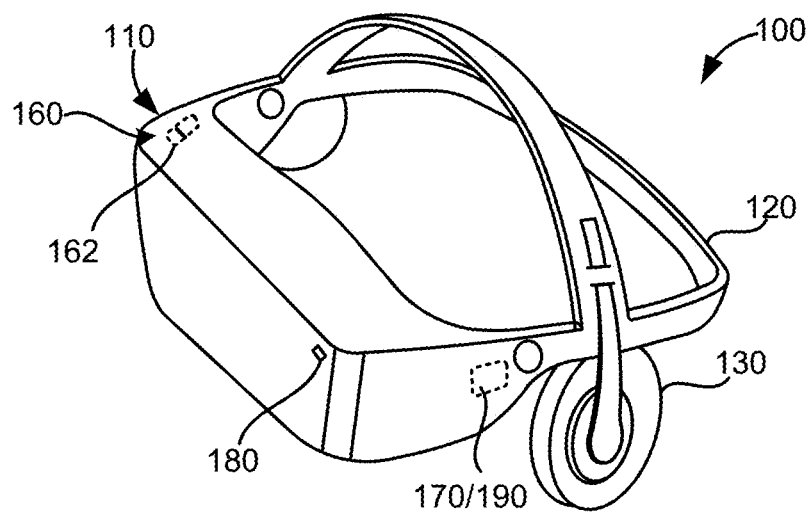
FIGS. 2A and 2B are perspective views of an example head mounted display device, in accordance with implementations as described herein.
Figure 2B:
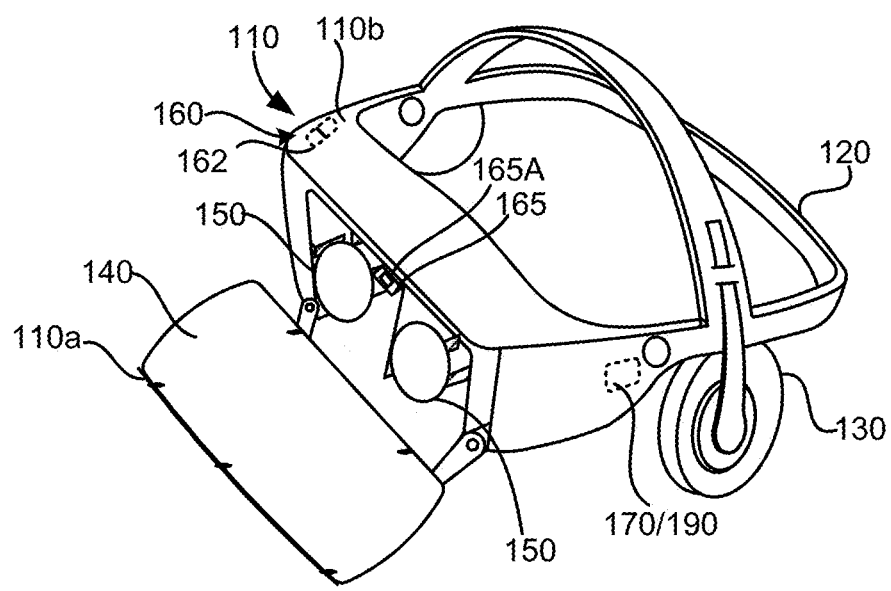

FIGS. 2A and 2B are perspective views of an example HMD, such as, for example, the HMD 100 worn by the user in FIG. 1. The HMD 100 may include a housing 110 coupled to a frame 120, with an audio output device 130 including, for example, speakers mounted in headphones, also coupled to the frame 120. In FIG. 2B, a front portion 110a of the housing 110 is rotated away from a base portion 110b of the housing 110 so that some of the components received in the housing 110 are visible. A display 140 may be mounted on an interior facing side of the front portion 110a of the housing 110. Lenses 150 may be mounted in the housing 110, between the user's eyes and the display 140 when the front portion 110a is in the closed position against the base portion 110b of the housing 110. The HMD 100 may include a sensing system 160 including various sensors and a control system 170 including a processor 190 and various control system devices to facilitate operation of the HMD 100. A camera 180 may capture still and/or moving images that may be used to help track a physical position of the user and/or the handheld electronic device 102. The captured images may also be displayed to the user on the display 140 in a pass through mode.

In some implementations, the HMD 100 may include a gaze tracking device 165 to detect and track an eye gaze direction and/or movement of the user. The gaze tracking device 165 may include one or more sensors 165A to detect and track eye gaze direction and movement. For example, the gaze tracking device 165 may include one or more light sensor(s) and/or one or more image sensor(s) 165A, and the like, to capture images of the user's eyes, for example, a particular portion of the user's eyes, such as, for example, the pupil. The images captured by the sensor(s) 165A may be processed to detect and track direction and movement of the user's eye gaze, and the detected and tracked eye gaze may be processed as a gaze gesture corresponding to a user input to be translated into a corresponding interaction in the immersive virtual experience. In some implementations, the HMD 100 may include an inertial measurement unit (IMU) 162 including, for example, a gyroscope, an accelerometer, and magnetometer and the like. Position and orientation information related to the HMD 100 provided by the IMU 162 may be used to detect and track head gaze direction and movement when the HMD 100 is worn by the user. The detected and tracked head gaze may be processed as a gaze gesture corresponding to a user input to be executed in the virtual environment.

Figure 3:
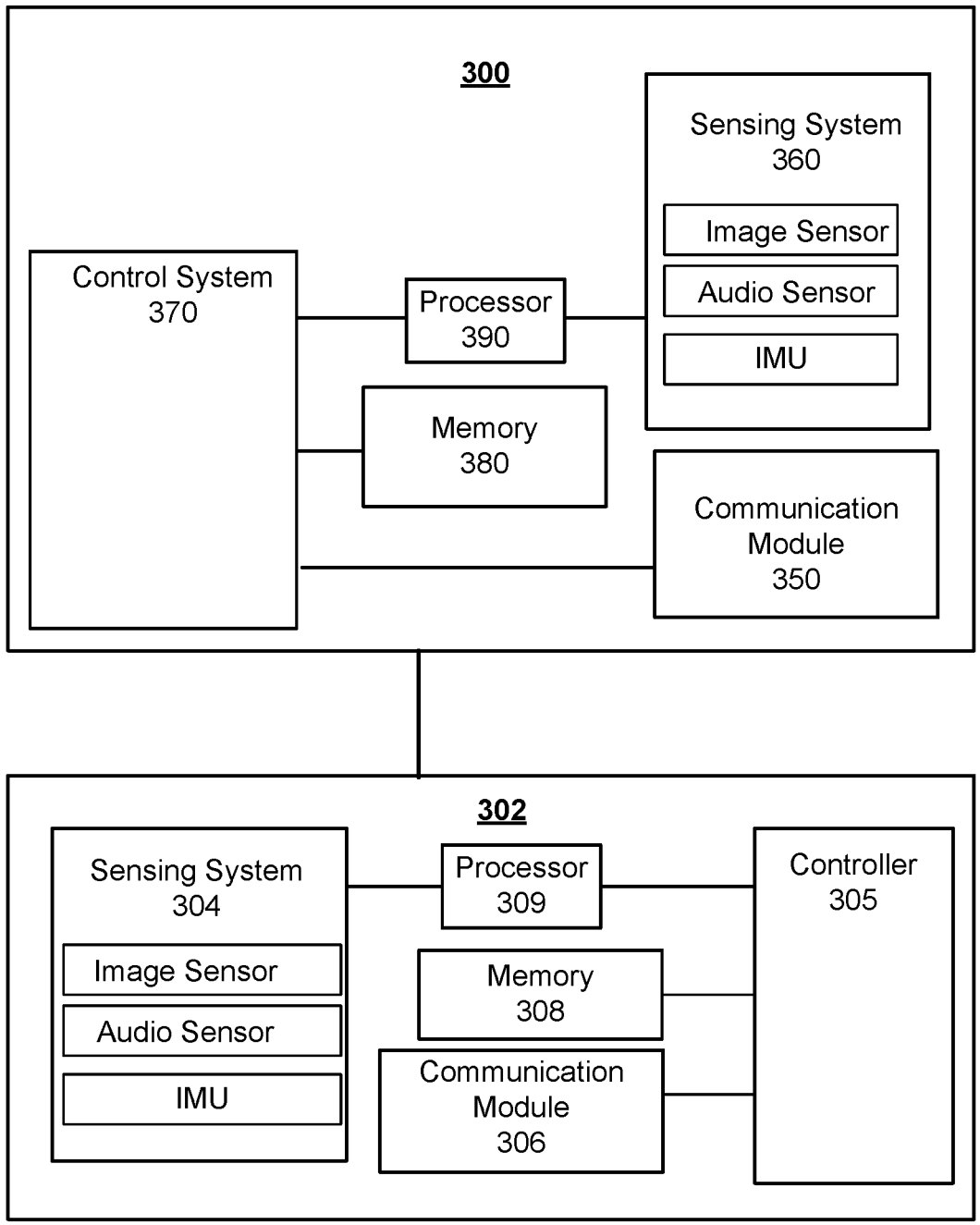
FIG. 3 is a block diagram of an augmented and/or virtual reality system, in accordance with implementations as described herein.

A block diagram of a system, in accordance with implementations described herein, is shown in FIG. 3. The system may include a first electronic device 300 (such as, for example, an HMD as described above with respect to FIGS. 1 and 2A-2B), and a second electronic device 302 (such as, for example, a handheld electronic device, or controller, as described above with respect to FIG. 1) in communication with the first electronic device 300.

The first electronic device 300 may include a sensing system 360 and a control system 370, which may be similar to the sensing system 160 and the control system 170, respectively, shown in FIGS. 2A and 2B. The sensing system 360 may include one or more different types of sensors, including, for example, a light sensor, an audio sensor, an image sensor, a distance/proximity sensor, and/or other sensors and/or different combination(s) of sensors, including, for example, one or more image sensors positioned to detect and track the user's eye gaze, such as the gaze tracking device 165 shown in FIG. 2B, and an IMU to detect and track head gaze direction and movement, such as the IMU 162 shown in FIGS. 2A-2B. The control system 370 may include, for example, a power/pause control device, audio and video control devices, an optical control device, a transition control device, and/or other such devices and/or different combination(s) of devices. The sensing system 360 and/or the control system 370 may include more, or fewer, devices, depending on a particular implementation. The elements included in the sensing system 360 and/or the control system 370 may have a different physical arrangement (e.g., different physical location) within, for example, an HMD other than the HMD 100 shown in FIGS. 2A and 2B. The first electronic device 300 may also include a processor 390 in communication with the sensing system 360 and the control system 370. The processor 390 may process inputs received from the sensing system 360, such as, for example, eye gaze direction and movement inputs captured by the eye gaze tracking device 165 shown in FIG. 2B and/or head gaze direction and movement inputs captured by the IMU 162 shown in FIGS. 2A-2B, to process inputs and execute instructions corresponding to the detected eye gaze inputs. The first electronic device 300 may also include a memory 380, and a communication module 350 providing for communication between the first electronic device 300 and another, external device, such as, for example, the second electronic device 302. The processor 390 may also process inputs received from the second electronic device 302.

The second electronic device 302 may include a communication module 306 providing for communication and data exchange between the second electronic device 302 and another, external device, such as, for example, the first electronic device 300. The second electronic device 302 may include a sensing system 304 including, for example, an image sensor and an audio sensor, such as is included in, for example, a camera and microphone, an inertial measurement unit, a touch sensor such as is included in a touch sensitive surface of a handheld electronic device, or smartphone, and other such sensors and/or different combination(s) of sensors. A processor 309 may be in communication with the sensing system 304 and a controller 305 of the second electronic device 302, the controller 305 having access to a memory 308 and controlling overall operation of the second electronic device 302.

As noted above, when experiencing a virtual reality environment generated by the HMD 100, it may be difficult for the user to provide some types of inputs via the controller 102. For example, it may be difficult for the user to view an interface provided on the controller 102, such as a keyboard for receiving a text input, when immersed in the virtual environment generated by the HMD 100. Similarly, it may be difficult for the user to maintain a connection between a virtual keyboard displayed by the HMD 100 and an input made, for example, by the user's finger on a touch surface of the controller 102 corresponding to the virtual keyboard displayed by the HMD 100. Thus, in a system and method, in accordance with implementations described herein, gaze gestures, such as, for example, eye swipes detected by, for example, the eye gaze tracking device 165 on the HMD 100 described above, on a virtual keyboard displayed in the virtual environment may be translated into a corresponding text input for interaction in the virtual environment. In some implementations, these types of user inputs may include the detected eye swipes taken together with inputs received at the controller 102.

As shown in FIG. 4A, a virtual object 450 may be displayed to the user in a virtual environment 400. In the example implementations to be discussed hereinafter with respect to FIGS. 5A through 7E, the example virtual object is a virtual user interface, and in particular, a virtual keyboard 450 configured to receive a text input from the user, for ease of discussion and illustration of the principles to be described. However, the principles to be described hereinafter may be applied to user interaction with other types of virtual objects. Hereinafter, simply for ease of discussion and illustration, principles will be described with respect to the detection and/or tracking of eye gaze, and eye gaze movement, and translation of the detected and tracked eye gaze/eye gaze movement, corresponding to a gaze gesture, into user inputs in the virtual environment. However, the principles to be described hereinafter may be applied to the detection and tracking of head gaze direction and head gaze movement, with translation of the detected and tracked head gaze direction and movement, corresponding to a gaze gesture, into user inputs in the virtual environment in a similar manner.

Figure 4B:
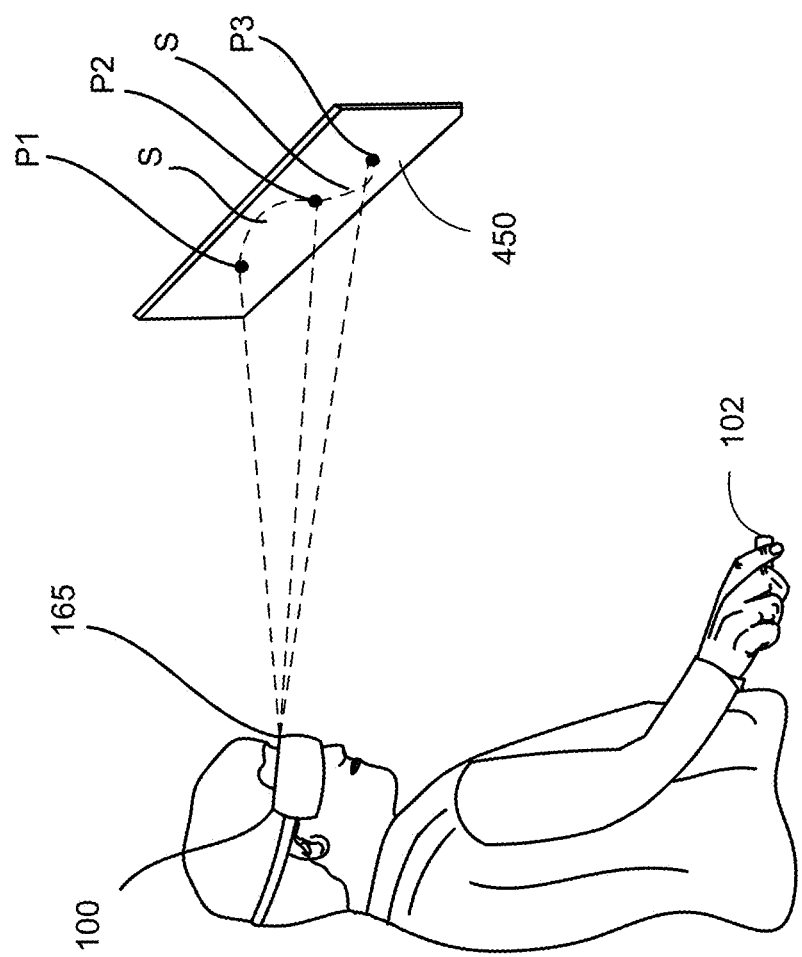

As shown in FIG. 4B, the user's gaze (for example, the user's eye gaze) may be tracked (for example, by the gaze tracking device 165), from a point P1, to a point P2, to a point P3, as well as a path, or swipe pattern S, of the movement of the user's gaze across the virtual keyboard 450, defining a gaze gesture. In this example, the points P1, P2 and P3 may represent dwell points, or points on the virtual keyboard 450 at which the user's gaze is sustained for greater than or equal to a pre-set threshold, and/or points on the virtual keyboard 450 at which the user's gaze changes direction. In this example, the swipe pattern S may correspond to a path defined by the user's gaze as the user's gaze moves along the virtual keyboard 450.

An example implementation of a hybrid character input system, including a user eye swipe input to a virtual keyboard in a virtual reality environment, together with a controller input, is shown in FIGS. 5A-5F. The example shown in FIGS. 5A-5F is a third person view of the user, wearing the HMD 100, holding the controller 102, and interacting with a virtual interface displayed on the HMD 100, for example, on the display 140 of the HMD 100. The virtual interface, including the virtual keyboard 450, is displayed to the user within the HMD 100, for example, on the display 140 of the HMD 100, but is illustrated outside of the HMD 100 for clarity in explanation. Similarly, the user's hand, holding the controller 102 would not be visible to the user wearing the HMD 100, nor would the controller 102 necessarily be rendered as a virtual object and displayed to the user on the HMD 100, but is illustrated for clarity in explanation.

Figure 5B:
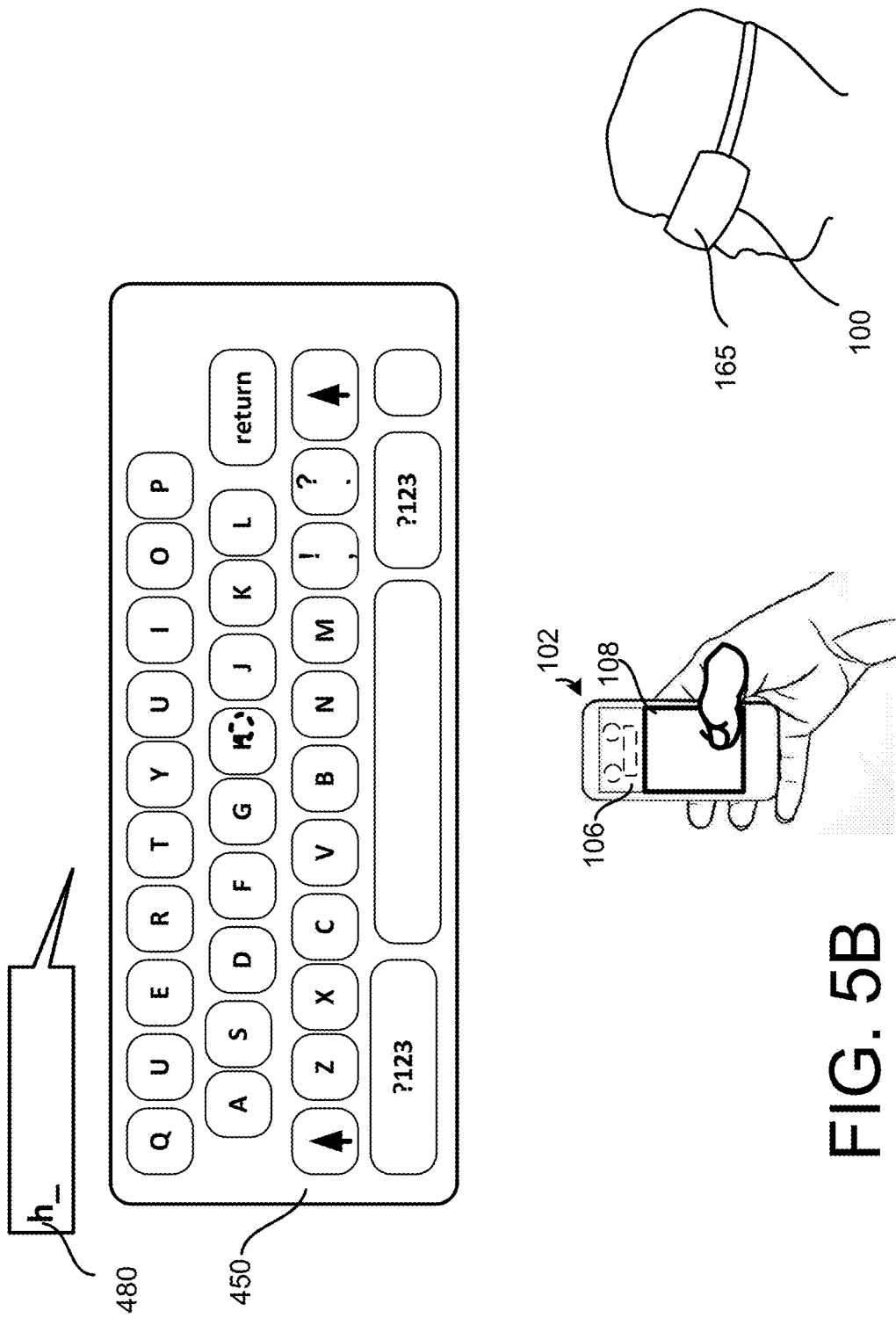

The user may intend to provide an eye gaze input via the virtual keyboard to make a text entry such as, for example, the word "hello" into a text entry window 480 also displayed in the virtual environment, as shown in FIG. 5A. In this example, with the virtual keyboard 450 displayed, the user's gaze focused on the letter H of the virtual keyboard 450 may be detected by, for example, the eye gaze tracking device 165 of the HMD 100, or another gaze tracking device operably coupled with the system as described above. This initial gaze directed at the letter H on the virtual keyboard 450 may set the letter H as a starting point for the text to be entered using the virtual keyboard 450 as the user applies a touch input to a touch surface 108 of the controller 102, as shown in FIG. 5B.

Initialization in this manner may establish a connection between the letter H displayed on the virtual keyboard 450 (in this example, the first letter of the text to be entered into the virtual text entry box 480), and a corresponding relative position of the user's finger on the touch surface 108 of the controller 102. This initial connection may facilitate the user's subsequent character entries via the touch surface 108 of the controller 102. In other words, in this example the user's initial gaze directed at a particular letter (in this case, the letter H of the virtual keyboard 450), together with a corresponding initial touch on the touch surface 108 of the controller 102, essentially calibrates the virtual keyboard 450 and the controller 102 for that particular text entry session. In this manner, no matter what the location of the initial touch point on the touch surface, that initial touch point on the touch surface 108 corresponds to the letter H, with relative movements along the touch surface 108 from that initial touch point then corresponding to relative movements from the letter H on the virtual keyboard 450. Once the user has established this connection, the user may maintain the touch on the touch surface 108 of the controller 102, and then drag or swipe along the touch surface 108 of the controller to enter subsequent characters, as shown in FIGS. 5C-5F. For example, as the user moves (drags, swipes and the like) the touch input from the initial position on the touch surface 108 (corresponding to the letter H of the virtual keyboard 450) shown in FIG. 5B to the position in FIG. 5C (corresponding to the letter E of the virtual keyboard 450), the letter "e" may be entered in the text entry box 480.

Entry of the letter "e" in the text entry box 480 may be determined by the system based on, for example, a pause at a location on the touch surface 108 of the controller 102 corresponding to the letter E on the virtual keyboard 450, a change in direction greater than or equal to a specified magnitude at the location on the touch surface 108 corresponding to the letter E on the virtual keyboard, and the like. In a similar manner, the system may also determine that intervening letters on the virtual keyboard 450, i.e., letters that the user's touch moves across while swiping on the touch surface 108 from the location on the touch surface 108 corresponding to the letter H to the location corresponding to the letter E on the virtual keyboard 450, but does not dwell on or change direction at, are not intended for entry in the text entry box 480.

Figure 5C:
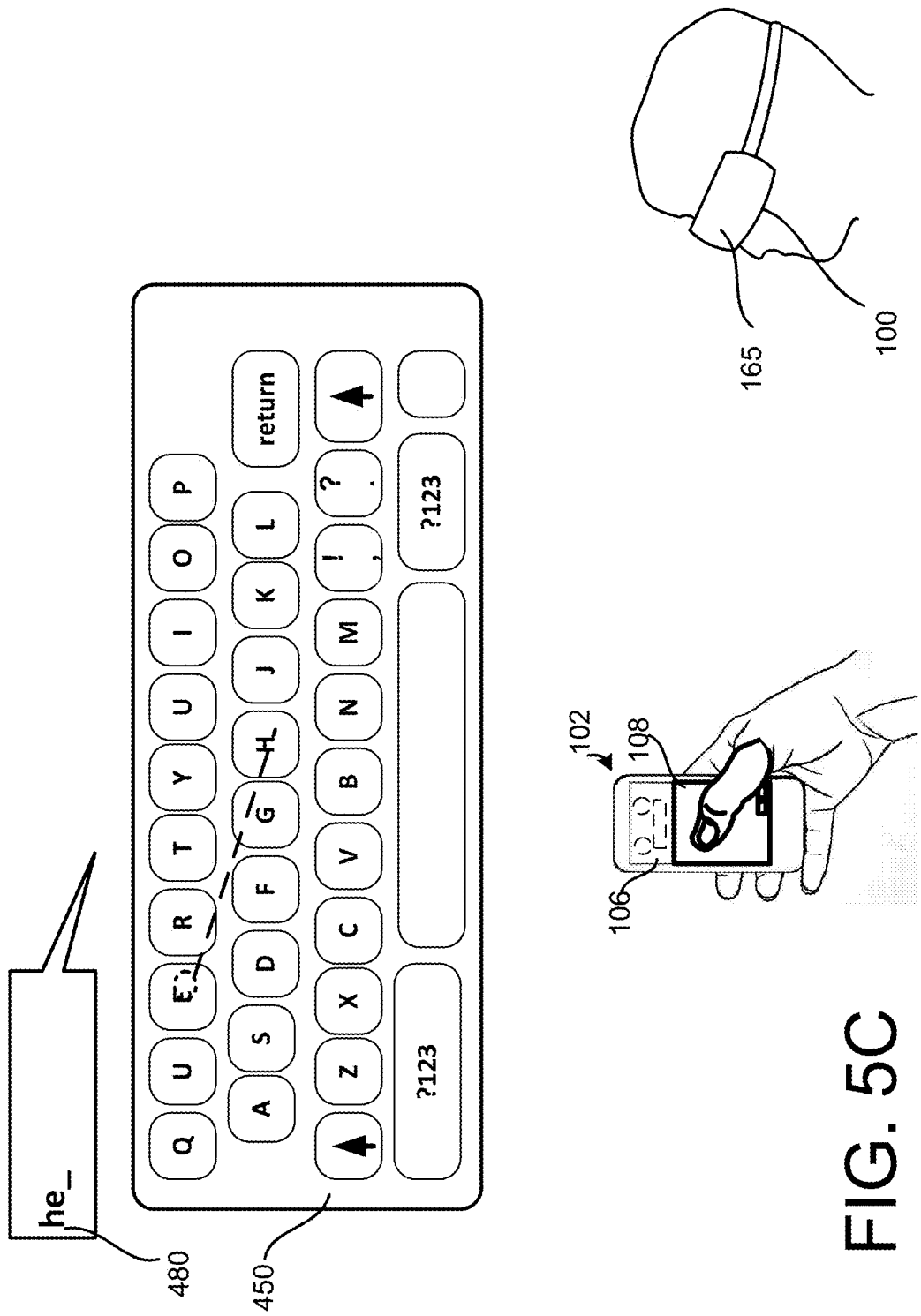
Figure 5D:
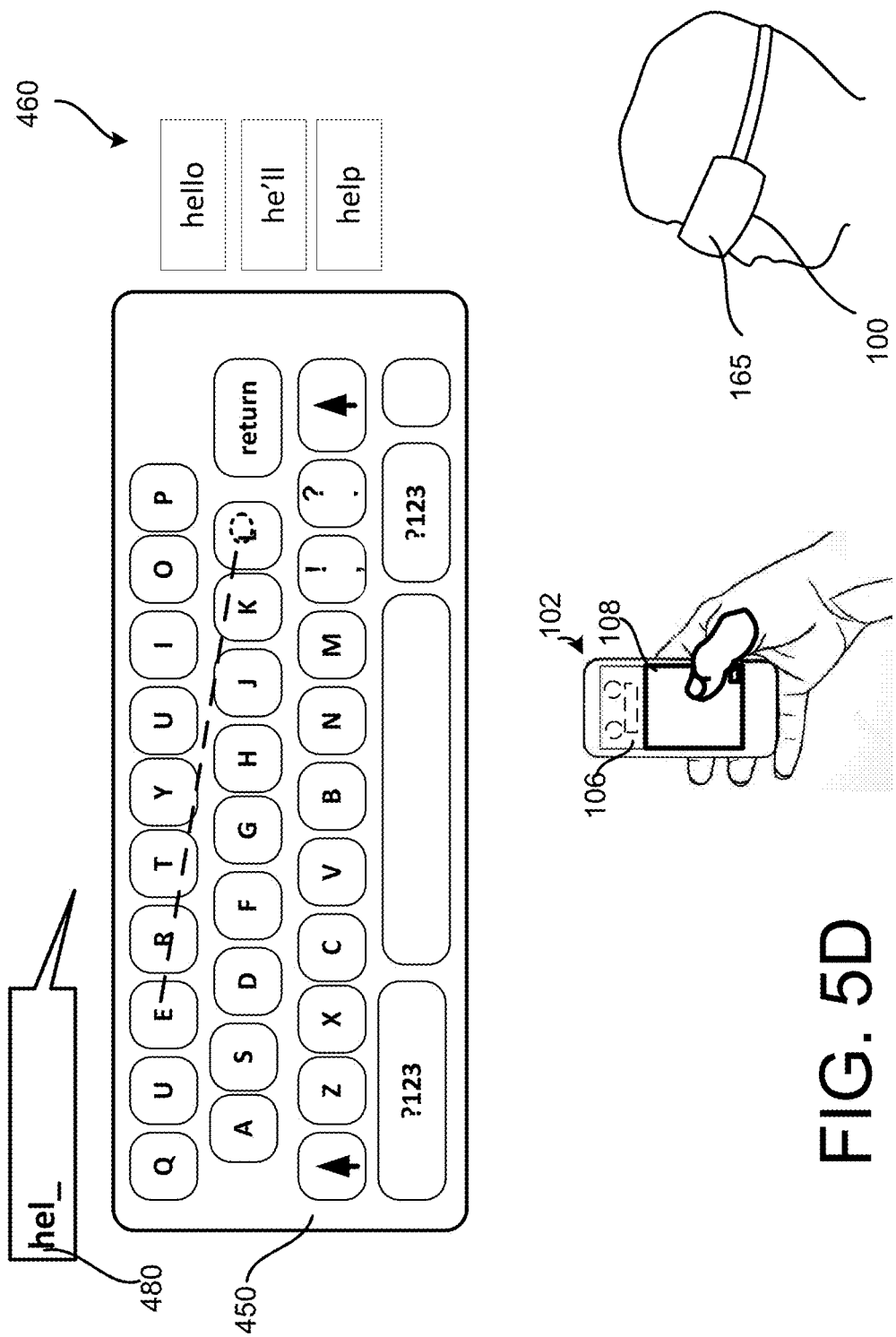

Similarly, as the user moves (drags, swipes and the like) the touch input from the position on the touch surface 108 (corresponding to the letter E of the virtual keyboard 450) shown in FIG. 5C to the position in FIG. 5D (corresponding to the letter L of the virtual keyboard 450), the letter "l" may be entered in the text entry box 480.

Figure 5E:
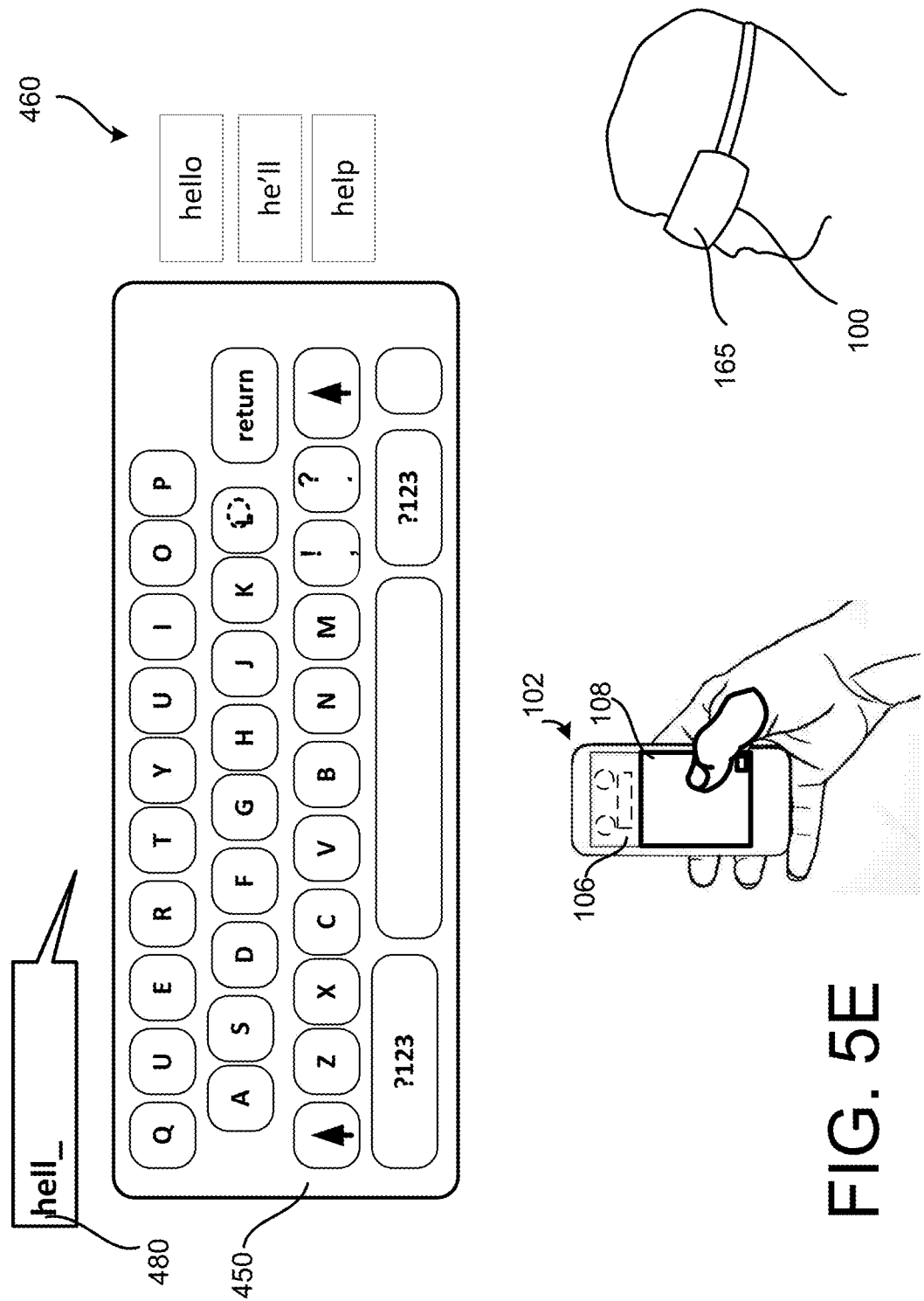

In order to repeat a character, such as, for example, the adjacent occurrence of the letter "l" in the word "hello," the user may, for example, maintain the touch input on the touch surface 108 of the controller 102 at the position shown in FIGS. 5D and 5E for a set amount time, until the second occurrence of the letter "l" appears in the text entry box 480, as shown in FIG. 5E. In some implementations, an input for a repeat character (such as the second occurrence of the letter "l" in the word "hello" in this example) may be detected by the eye gaze tracking device 165, for example, in response to a detected blink. In some implementations, an input for a repeat character (such as the second occurrence of the letter "l" in the word "hello" in this example) may be detected in response to a secondary input received, for example, at a manipulation device 106 of the controller 102 while the user's touch is maintained on the touch surface 108 of the controller 102, and/or a manipulation device of the HMD 100.

Figure 5F:
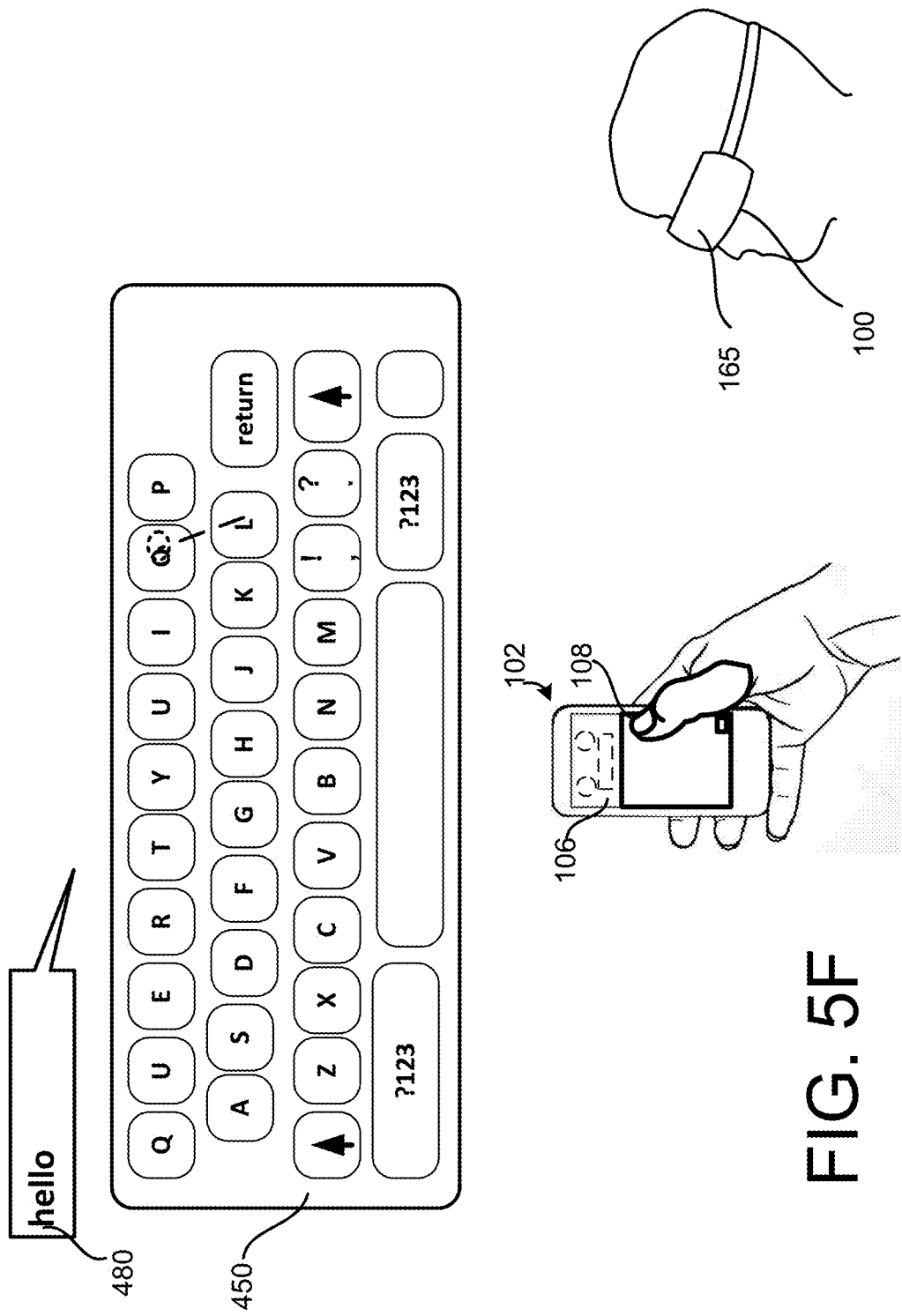

Once the second occurrence of the letter "l" has been entered in the text entry box 480, as shown in FIG. 5E, the user may then move (drag, swipe and the like) the touch input from the position on the touch surface 108 (corresponding to the letter L of the virtual keyboard 450) shown in FIG. 5E to the position in FIG. 5F (corresponding to the letter O of the virtual keyboard 450), and the letter "o" may be entered in the text entry box 480. To complete the text entry, and indicate completion of a word, phrase and the like, the user may then release the touch from the touch surface 108 of the controller 102. Thus, in this example implementation, a part of the entry in the text entry box 480 is generated in response to eye gaze input, and another part of the entry is generated in response to a touch input on the touch surface 108 of the controller 102. That is, in this example, the user may initiate an entry in the text entry box 480 with an eye gaze, and complete the entry in the text entry box 480 based on a touch input(s) applied to the touch surface 108 of the controller 102.

In some implementations, the input to the controller 102 causing characters to be entered into the text entry box 480 may be based on physical movement of the controller 102, rather than the detected input on the touch surface 108 of the controller 102 as described above. That is, the user's eye gaze, together with an input at the controller 102, for example, a touch input on the touch surface 108 or a manipulation of another manipulation device 106 of the controller 102 may be used to specify the initial point, corresponding to the first character to be entered in the text entry box 480. The user may then provide a physical gesture with the controller 102, such as, for example, a move, or drag, or other physical gesture with the controller 102, in a pattern corresponding to the sequence of characters to be entered in the text entry box 480. As the six degree of freedom position of the controller 102 is known and tracked by the system, characters may be entered in the text entry box 480 based on the detected and tracked physical movement of the controller 102 until, for example, the user releases the touch on the touch surface 108 of the controller 102, or until the user releases depression of the manipulation device 106 of the controller 102, or other input.

In some implementations, the system may anticipate, or predict the user's intended entry based on, for example, characters already entered, word(s) and/or phrase(s) preceding the current entry, a particular user's usage history, and other such factors, and may display a list 460 including one or more recommended or suggested entries, as shown in FIG. 5E. In this situation, the user may, instead of completing all of the steps discussed above with respect to FIGS. 5E-5F to complete entry of the word "hello" the user may instead re-direct the finger touch and drag, or swipe, along the touch surface 108 of the controller 102 to the desired entry in the list 460 to complete entry of the desired word in the text entry box 480.

Figure 5G:
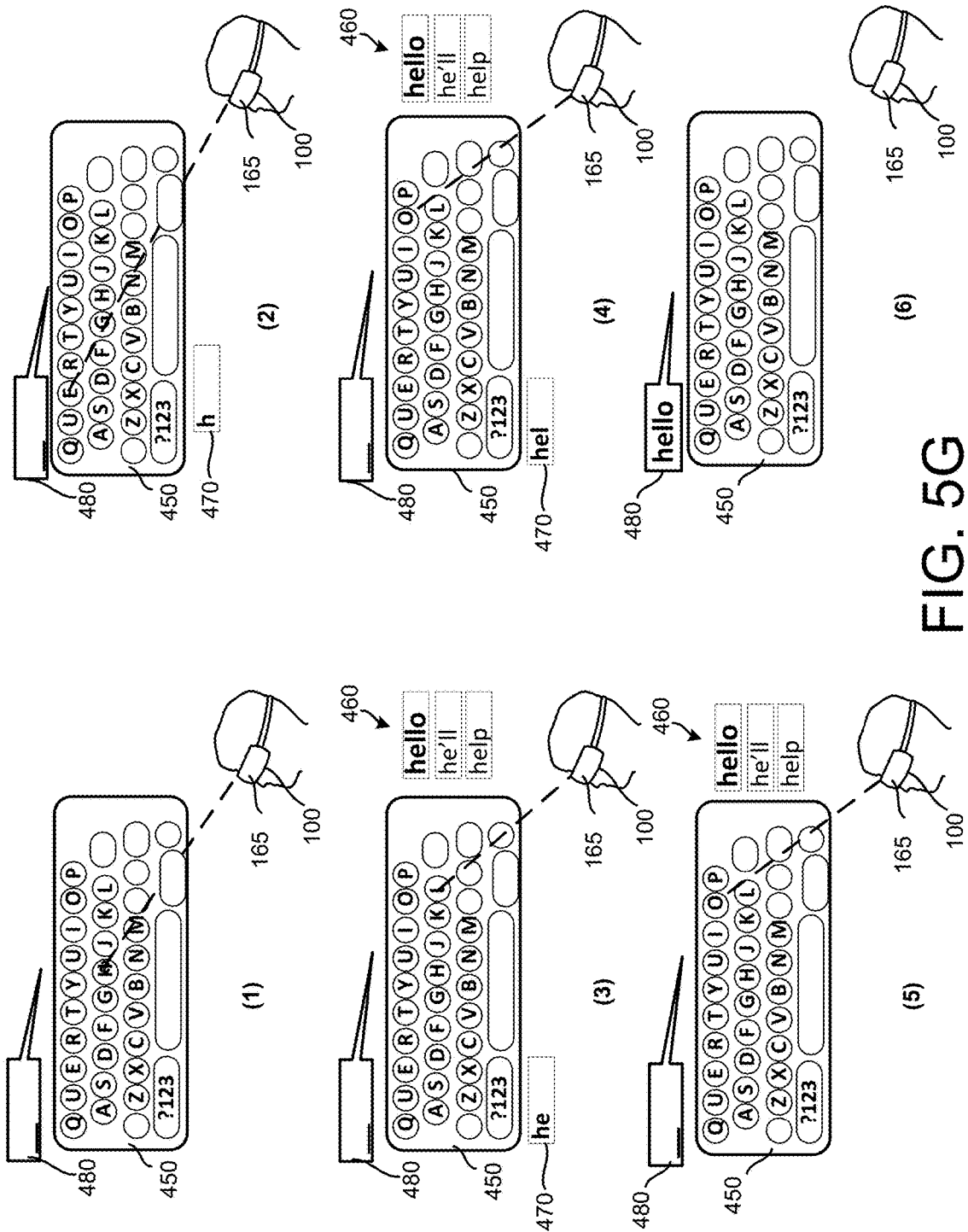

In the example illustrated in FIGS. 5A-5F, characters are entered in the text entry box 480 individually, with each detection of a selection of an individual letter during the user's movement (drag, swipe, and the like) along the touch surface 108 of the controller 102. In some implementations, the completed text/character entry may be displayed in the text entry box 480 after the completion of the entry of the word is detected by, for example, for example, an eye swipe input followed by a detected release of the user's touch on the touch surface 108 of the controller 102, as illustrated in the example sequence shown in FIG. 5G. In this example, the text entry box 480 would remain essentially blank, as shown in FIGS. 5G(1) through 5G(5), until an entry completion input, such as, for example, a release of the touch from the touch surface 108, is detected, as shown in FIG. 5G(6). The word "hello" would be displayed in the text entry box 480 upon detection of the entry completion input. In some implementations, the system may display a preview pane 470, allowing the user to preview the text entries as entry of individual characters is detected, and before completion and entry into the text entry box 480. In some implementations, the list 460 of suggested entries may be displayed to the user as the user implements the entries on the virtual keyboard 450 as described above, allowing the user to swipe over to one of the suggested entries in the list 460 to select one of the suggested entries displayed in the list 460. In some implementations, the list 460 of suggested entries may be displayed before the user has completed an entry in this manner, based on, for example, an analysis of the input/swipe pattern to that point, comparison to stored patterns, an analysis of the entries preceding the current entry, historical usage and patterns associated with a particular user, and the like. A prediction of a likely entry to be made may be based on the analysis. In some implementations, the suggested entry having the highest probability of matching the user's swipe entry in progress may be listed first, and/or an appearance of the suggested entry having the highest probability may be altered (highlighted, bolded, underlined, and the like), to provide a visual indication to the user. Based on this visual indication the user may implement an action, such as, for example, releasing the touch on the touch surface 108 of the controller 102, to cause the suggested entry (having the highest probability) to be entered in the text entry box 480, without actually completing the input/swipe for the entire entry.

In the example implementation shown in FIGS. 5A-5F, characters/text may be entered based on gaze detection to detect and set an initial character of the intended entry, and then continuous swipes on the touch surface 108 of the controller 102 to enter subsequent character(s). Setting an initial point using gaze detection, for example, eye gaze detection, may establish a connection between the selected letter displayed on the virtual keyboard 450 and a relative position of the user's finger on the touch surface 108 of the controller 102, helping to orient the user's subsequent swipes on the touch surface 108.

Figure 6A:
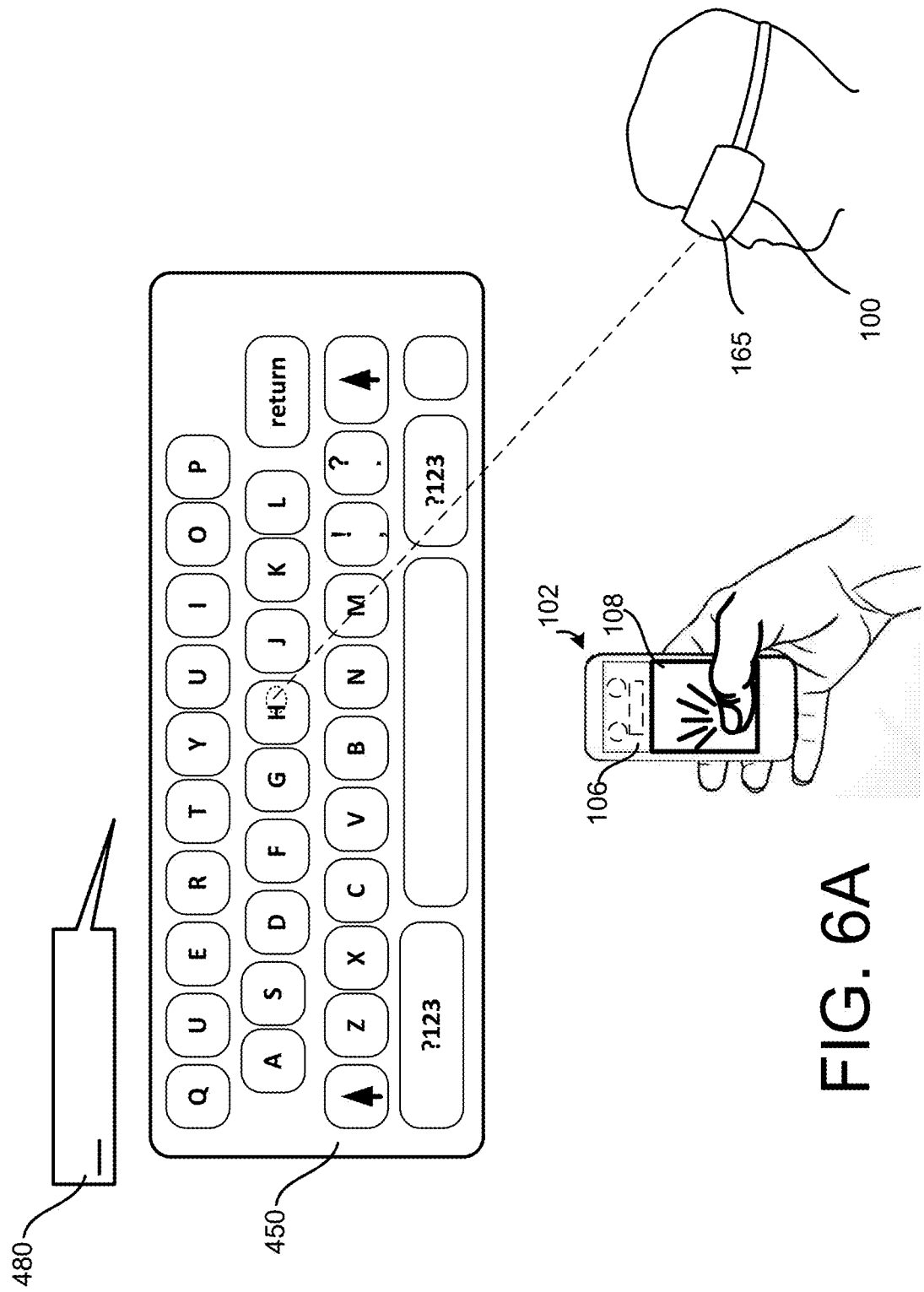
Figure 6B:
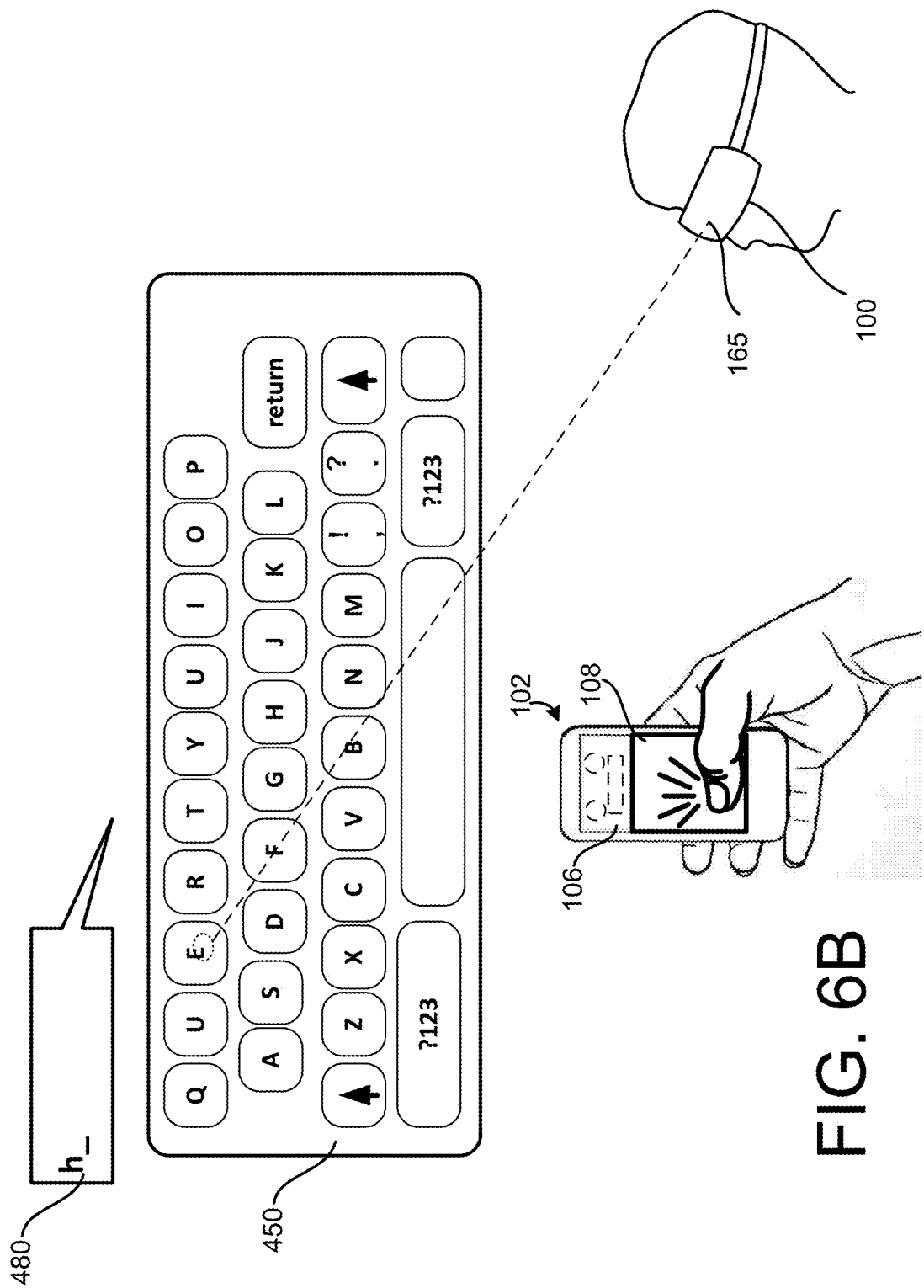

Another example implementation of a hybrid text input system, including a user eye swipe input to a virtual keyboard in a virtual reality environment, together with a controller input, is shown in FIGS. 6A-6F. In this example, the user may intend to provide a gaze input, for example, an eye gaze input via the virtual keyboard 450 to make a text entry such as, for example, the word "hello" into the text entry box 480, as shown in FIG. 6A. In this example, with the virtual keyboard 450 displayed, the user's gaze directed on the letter H of the virtual keyboard 450 may be detected by the eye gaze tracking device 165 of the HMD 100, or another gaze tracking device operably coupled with the system. In response to a detected touch and release input, or tap, on the touch surface 108 of the controller 102, with the user's gaze detected on the letter H of the virtual keyboard 450, the letter "h" may be entered in the text entry box 480, as shown in FIG. 6B.

Figure 6C:
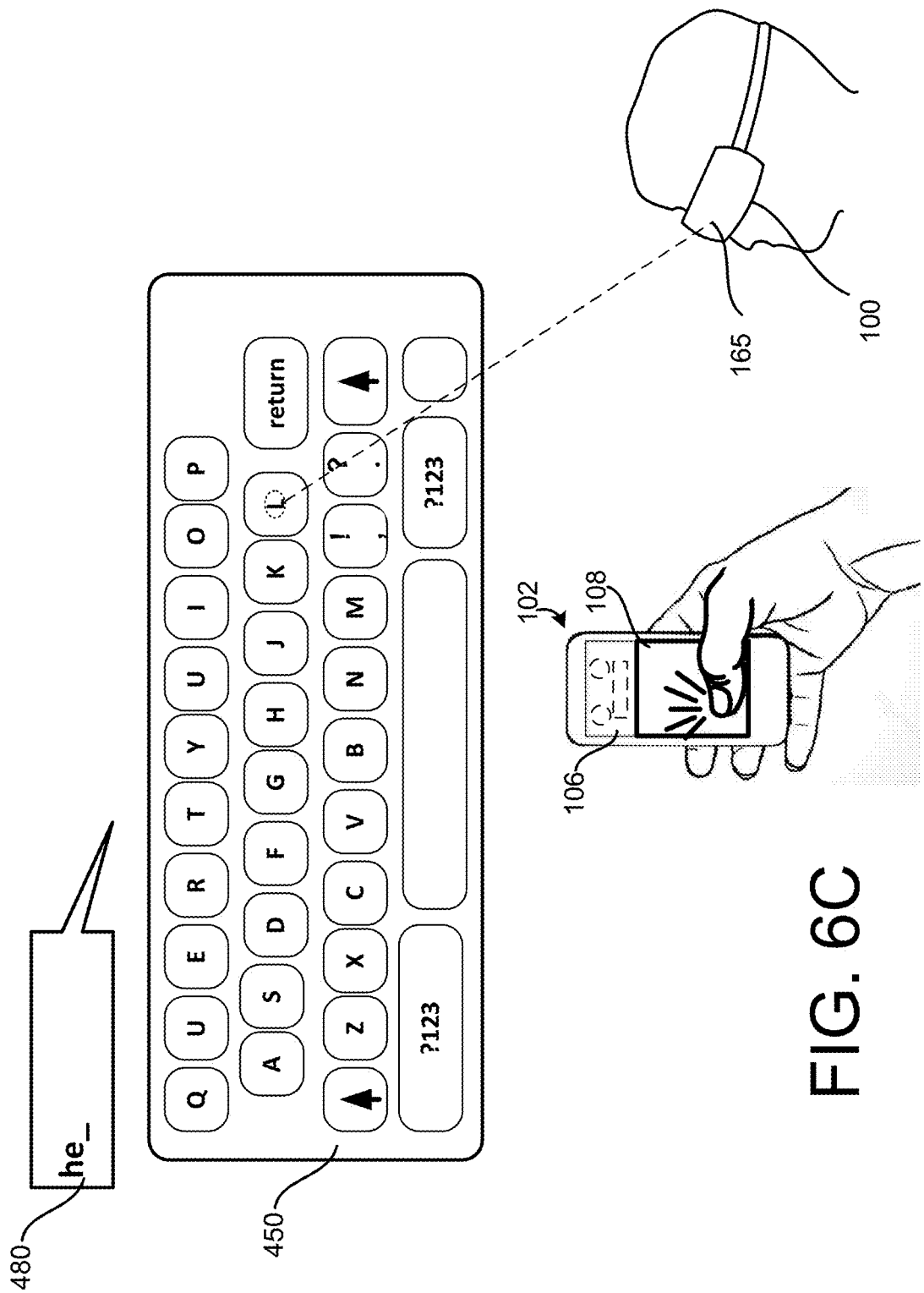

The user's eye gaze on the letter E of the virtual keyboard 450 (shown in FIG. 6B, after release of the first tap and entry of the letter "h" in the text entry box 480) may then be detected by the eye gaze tracking device 165 of the HIVID 100, or another eye gaze tracking device operably coupled with the system. In response to a detected touch and release input, or tap, on the touch surface 108 of the controller 102, with the user's eye gaze on the letter E of the virtual keyboard 450, the letter "e" may be entered in the text entry box 480, as shown in FIG. 6C. The user's eye gaze on the letter E of the virtual keyboard 450 may be detected by the eye gaze tracking device 165 of the HIVID 100, or another eye gaze tracking device operably coupled with the system. In response to a detected touch and release input, or tap, on the touch surface 108 of the controller 102, with the user's eye gaze focused on the letter E on the virtual keyboard 450, the letter "e" may be entered in the text entry box 480, as shown in FIG. 6C.

In order to repeat a character, such as, for example, the adjacent occurrence of the letter "l" in the word "hello," the user may, for example, maintain the eye gaze on the letter L of the virtual keyboard 450, and input another touch and release, or tap, on the touch surface 108 of the controller 102, so that the second occurrence of the letter "l" appears in the text box 480, as shown in FIG. 6E. In some implementations, an input for a repeat character (such as the second occurrence of the letter l in the word "hello" in this example) may be detected by the eye gaze tracking device 165, for example, in response to a detected blink. In some implementations, an input for a repeat character (such as the second occurrence of the letter "l" in the word "hello" in this example) may be detected in response to a secondary input received, such as a second tap, for example, at a manipulation device 106 of the controller 102 while the user's touch is maintained on the touch surface 108 of the controller 102, or at a manipulation device of the HMD 100.

The user's eye gaze on the letter O of the virtual keyboard 450, as shown in FIG. 6E, may be detected by the eye gaze tracking device 165 of the HMD 100, or another eye gaze tracking device operably coupled with the system. In response to a detected touch and release input, or tap, on the touch surface 108 of the controller 102, with the user's eye gaze on the letter O on the virtual keyboard 450, the letter "o" may be entered in the text entry box 480, as shown in FIG. 6F.

Figure 6D:
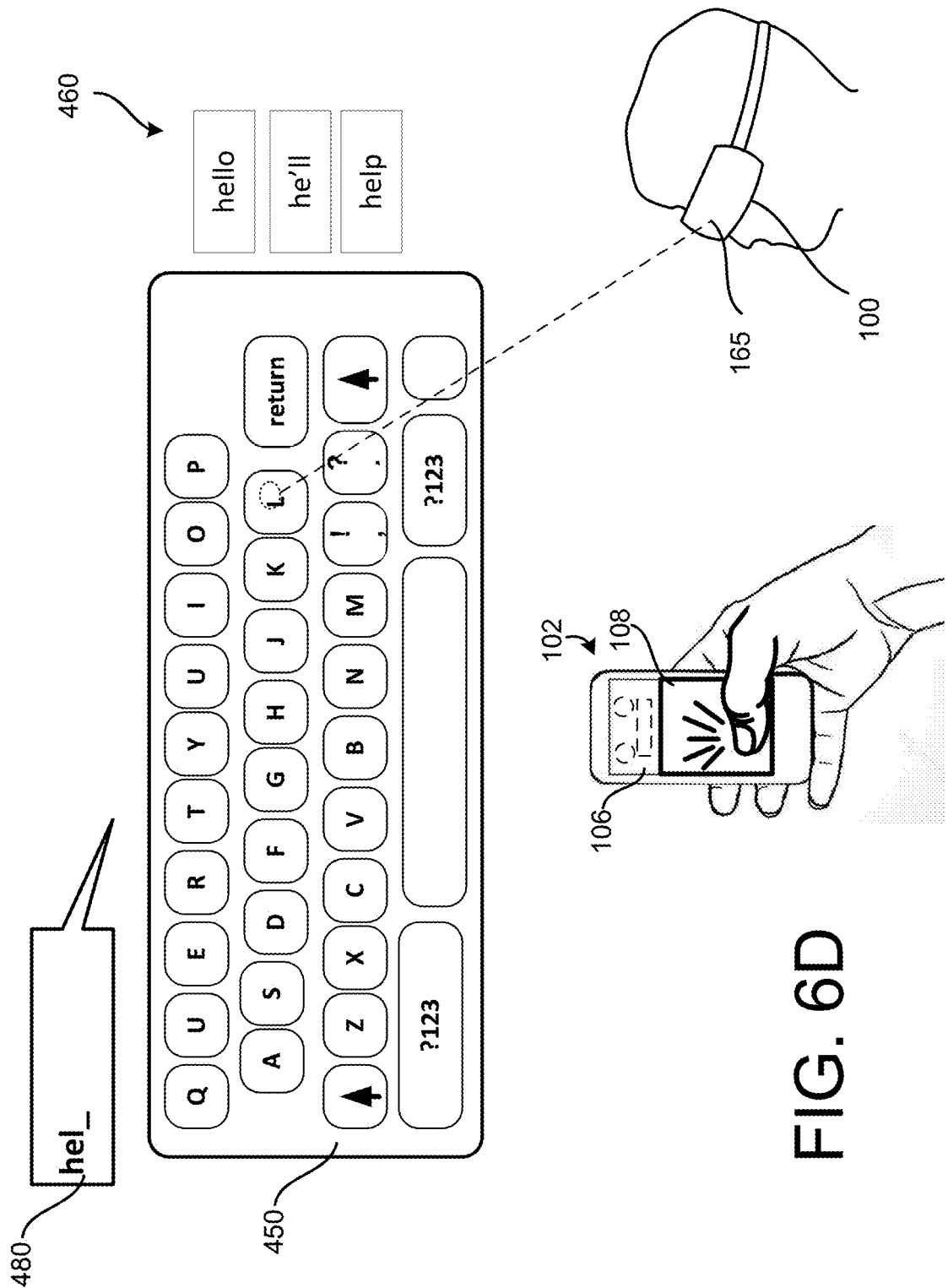

In some implementations, the system may anticipate, or predict the user's intended entry based on, for example, characters already entered, word(s) and/or phrase(s) preceding the current entry, a particular user's usage history, and other such factors, and may display a list 460 including one or more recommended or suggested entries, as shown in FIG. 6D. In this situation, the user may, instead of completing all of the steps discussed above with respect to FIGS. 6D-6E to complete entry of the word "hello" the user may instead re-direct his eye gaze to the desired entry in the list 460 to complete entry of the desired word in the text entry box 480.

In the example implementation shown in FIGS. 6A-6F, characters/text may be entered based on an eye gaze detection to detect and set a character to be entered, and the character on which the user's eye gaze is focused may be entered in the text entry box 480 in response to a touch and release, or tap, on the touch surface 108 of the controller 102. Selecting individual characters to be entered based on eye gaze detection, with confirmation of the selected character and entry in the text box 480 in response to a touch or tap on the controller 102 may facilitate accurate entry of text into the virtual text box 480 using the virtual keyboard 450. In some implementations, the touch and release, or tap, or other positive confirmation may be entered/received at, for example, one of the other manipulation devices 106 of the controller 102, a manipulation device provided on the HMD 100, and the like.

In the example illustrated in FIGS. 6A-6G, characters are entered in the text entry box 480 individually, with each detection of a selection of an individual letter and corresponding touch or tap on the touch surface 108 of the controller. In some implementations, the completed text/character entry may be displayed in the text entry box 480 after the completion of the entry of the word is detected by, as illustrated in the example sequence discussed above with respect to FIG. 5G. In the example shown in FIG. 5G, the text entry box 480 would remain essentially blank, as shown in FIGS. 5G(1) through 5G(5), until the user has completed entry of the word and has provided an entry completion input, such as, for example, a physical movement or gesture of the controller 102, a release of the user's gaze from the virtual keyboard 450 and the like, as shown in FIG. 5G(6). The word "hello" would be displayed in the text entry box 480 upon detection of the entry completion input. As noted above, the preview pane 470 may allow the user to preview the text entries as entry of individual characters is detected, and before completion and entry into the text entry box 480. As noted above, the list 460 of suggested entries may be displayed to the user as the user implements the entries as described above, allowing the user to select one of the suggested entries displayed in the list 460. As noted above, the list 460 of suggested entries may be displayed before the user has manually completed an entry, based on, for example, an analysis of the input/swipe pattern to that point, comparison to stored patterns, an analysis of the entries preceding the current entry, historical usage and patterns associated with a particular user, and the like and corresponding prediction of a likely entry. In some implementations, the suggested entry having the highest probability of matching the user's swipe entry in progress may be listed first, and/or an appearance of the suggested entry having the highest probability may be altered (highlighted, bolded, underlined, and the like), to provide a visual indication to the user. Based on this visual indication the user may implement an action to cause the suggested entry (having the highest probability) to be entered in the text entry box 480, without actually completing the manual entry of characters.

Figure 7A:
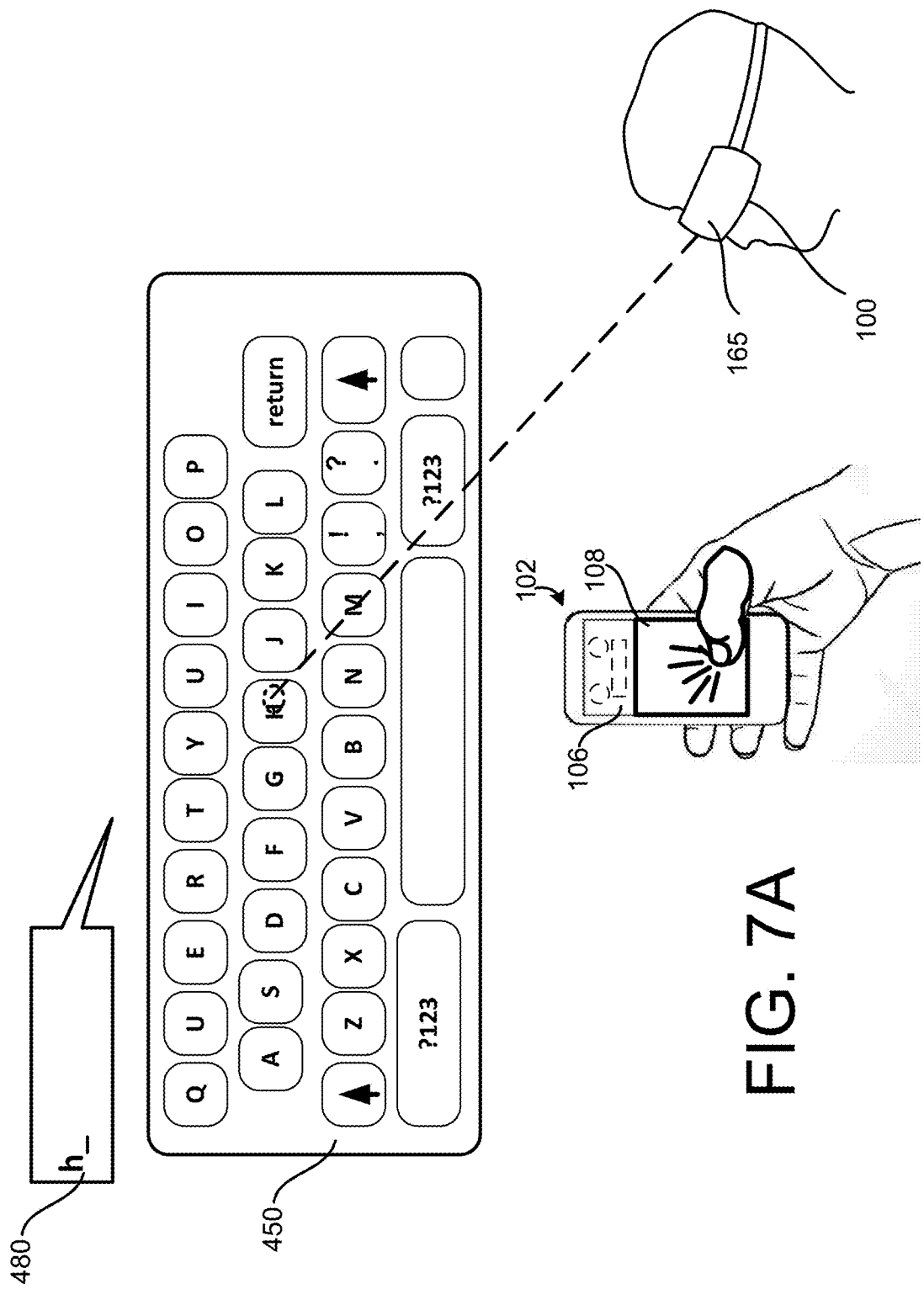

Another example implementation of a hybrid text input system, including a user eye swipe input to a virtual keyboard in a virtual reality environment, together with a controller input, is shown in FIGS. 7A-7E. In this example, with the virtual keyboard 450 displayed, the user's gaze on the letter H of the virtual keyboard 450 may be detected by the eye gaze tracking device 165 of the HMD 100, or another gaze tracking device operably coupled with the system, and the user may apply a touch and hold input to the touch surface 108 of the controller, as shown in FIG. 7A. This initial gaze directed at the letter H on the virtual keyboard 450, together with the touch and hold input applied to the touch surface 108 of the controller 102, may set the letter H as a starting point for the text to be entered using a swiping action, for example, an eye swiping action, along the virtual keyboard 450, as shown in FIGS. 7B-7E, causing corresponding characters and/or text be entered in the text entry box 480.

Figure 7C:
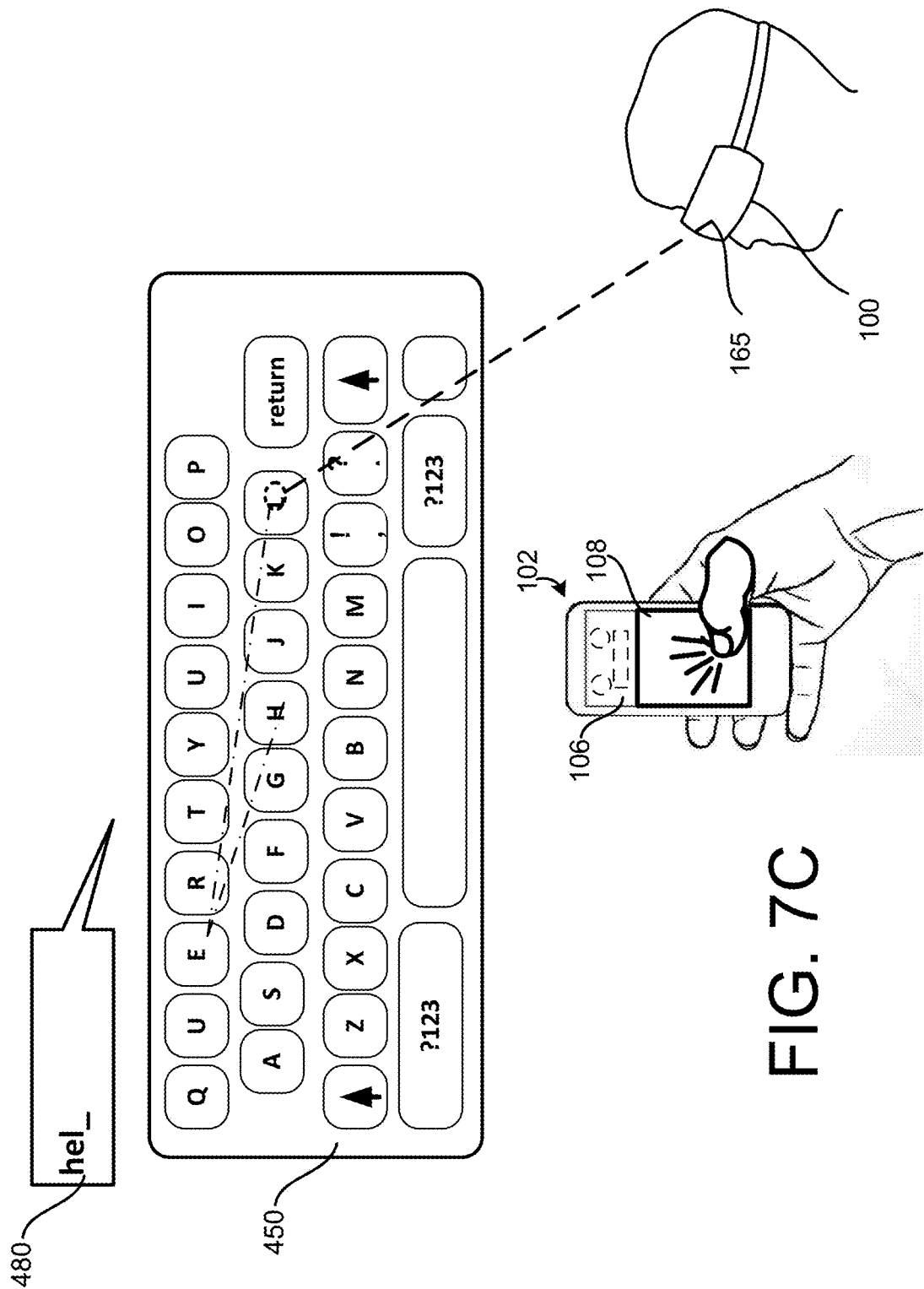

Initialization in this manner may establish a starting point on the virtual keyboard 450 for the eye swipe to be applied to the virtual keyboard 450 in making a text entry, for example, in the text entry box 480, and to indicate that the first letter to be entered into the text entry box 480 is the letter "h" as shown in FIG. 7A. The user may maintain the touch on the touch surface 108 of the controller 102, to indicate that the system is to continue to record character entries in the text box 480 in response to eye swipes along the virtual keyboard 450. After entry of the letter "h" in the text entry box 480 as shown in FIG. 7A, the user may apply an eye swipe from the letter H on the virtual keyboard 450 to the letter E on the virtual keyboard 450, as shown in FIG. 7B, to enter the letter "e" in the text entry box 480, and then apply an eye swipe from the letter E to the letter L on the virtual keyboard 450, as shown in FIG. 7C, to enter the letter "l" in the text entry box 480.

Figure 7D:
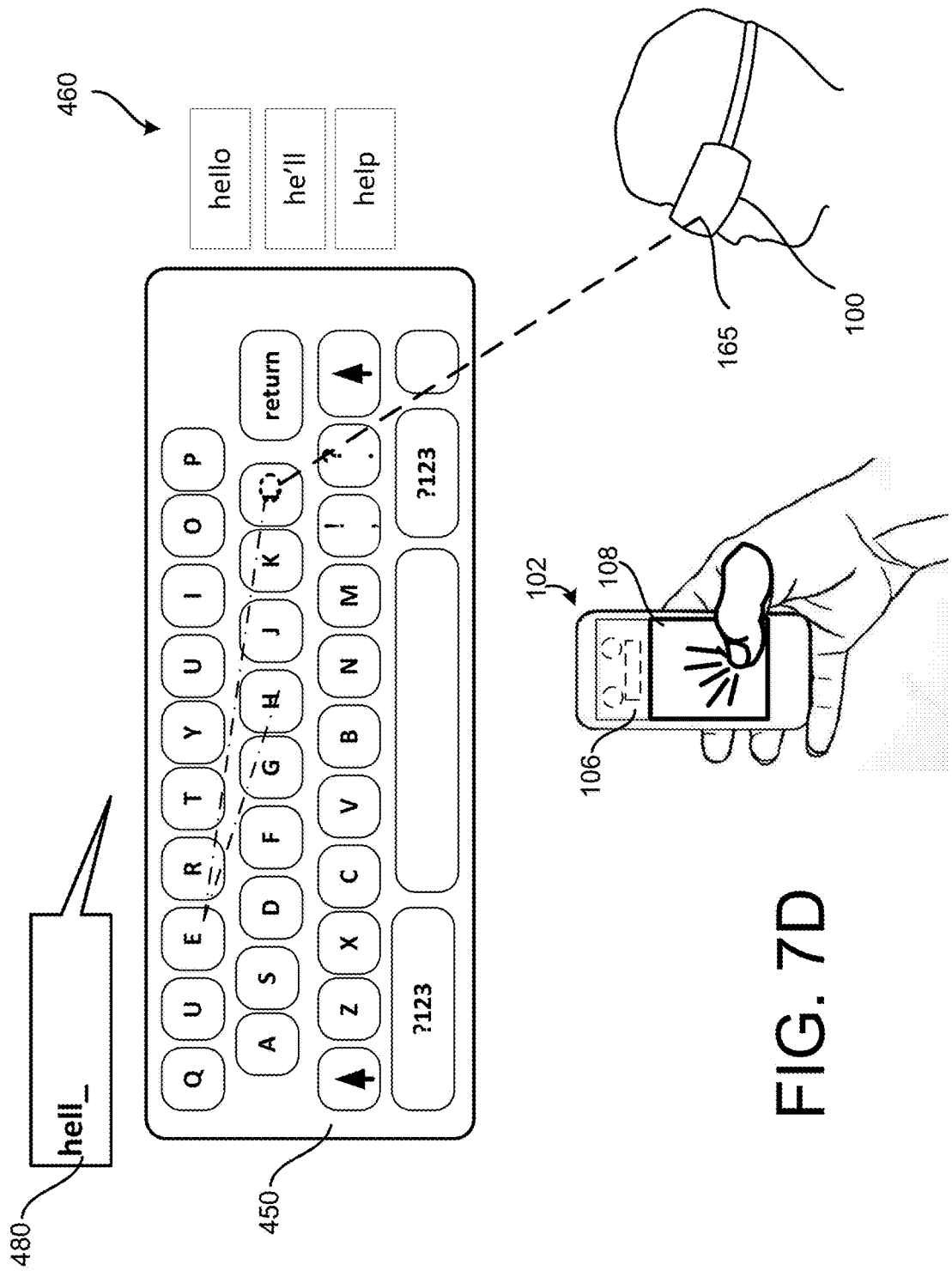

In order to repeat a character, such as, for example, the adjacent occurrence of the letter "l" in the word "hello," the user may, for example, maintain a gaze directed at the letter L on the virtual keyboard 450 for a set amount time, until the second occurrence of the letter "l" appears in the text box 480, as shown in FIG. 7D. In some implementations, an input for a repeat character (such as the second occurrence of the letter "l" in the word "hello" in this example) may be detected by the eye gaze tracking device 165, for example, in response to a detected blink. In some implementations, an input for a repeat character (such as the second occurrence of the letter l in the word "hello" in this example) may be detected in response to a secondary input received, for example, at the manipulation device 106 of the controller 102 or a manipulation device of the HMD 100, while the user's touch is maintained on the touch surface 108 of the controller 102.

Figure 7E:
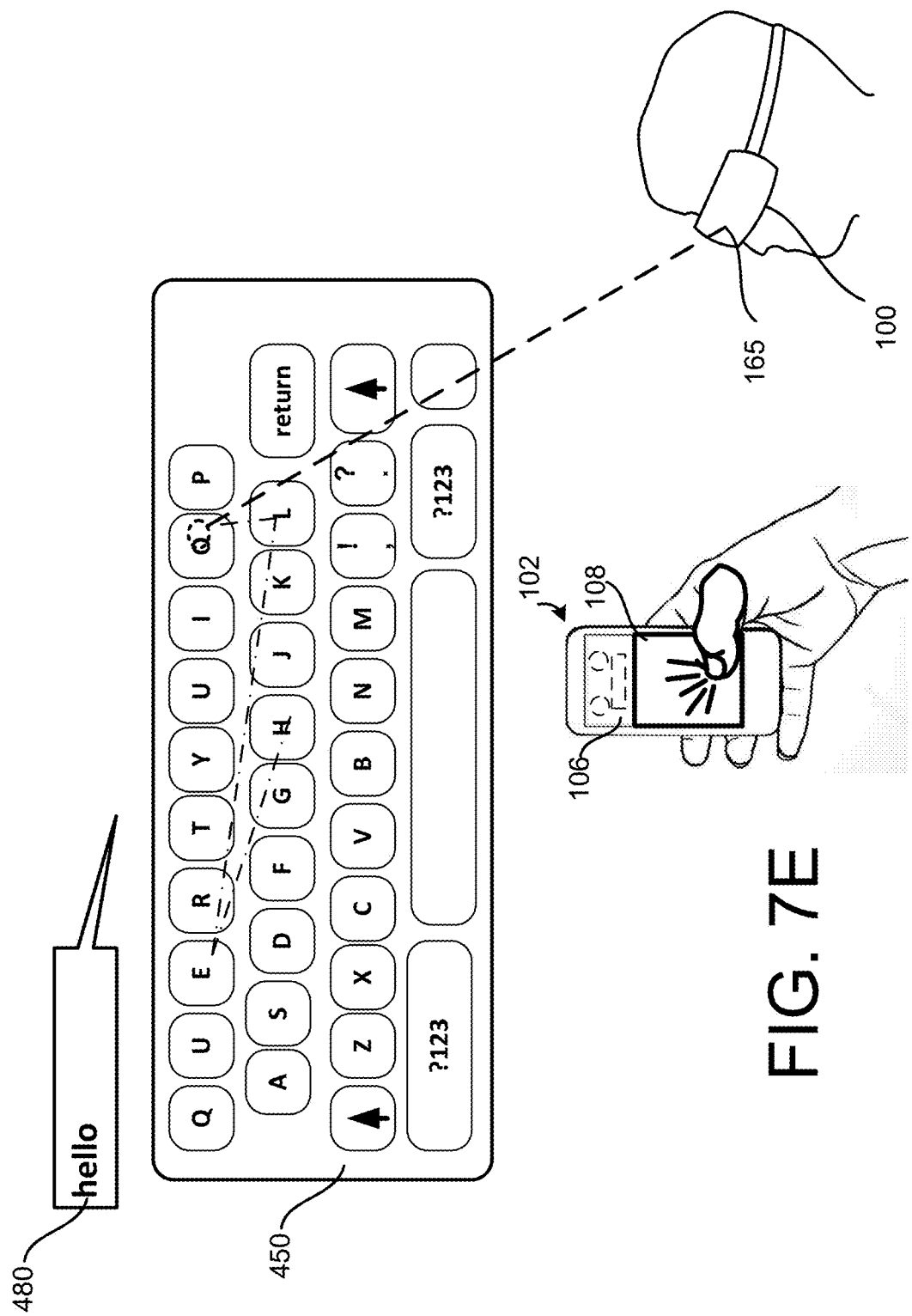

Once the second occurrence of the letter "l" has been entered in the text box, as shown in FIG. 7D, the user may then apply an eye swipe from the letter L to the letter O on the virtual keyboard 450, as shown in FIG. 7E, to enter the letter "o" in the text entry box 480 and complete the entry of the word "hello." To complete the text entry, and indicate completion of a word, phrase and the like, the user may, for example, release the touch from the touch surface 108 of the controller 102, look away from the keyboard 450, and the like.

In some implementations, the system may anticipate, or predict the user's intended entry based on, for example, characters already entered, word(s) and/or phrase(s) preceding the current entry, a particular user's usage history, and other such factors, and may display the list 460 including one or more recommended or suggested entries, as shown in FIG. 7D. In this situation, the user may, instead of completing all of the steps discussed above with respect to FIGS. 7D-7E to complete entry of the word "hello" the user may instead re-direct the eye gaze to the desired entry in the list 460 to complete entry of the desired word in the text entry box 480.

In the example illustrated in FIGS. 7A-7E, characters are entered in the text entry box 480 individually, with each detection of a selection of an individual letter during the user's swipe along the virtual keyboard 450. In some implementations, the completed text/character entry may be displayed in the text entry box 480 after the completion of the entry of the word is detected by, for example, the detected release of the user's touch on the touch surface 108 of the controller 102, detection that the user's gaze is directed away from the virtual keyboard 450, and the like, as illustrated in the sequence shown in FIG. 5G. In this example, the text entry box 480 would remain essentially blank, as shown in FIGS. 5G(1) through 5G(5), until the user's touch is released from the touch surface 108 or the user's gaze is directed away from the virtual keyboard 450, indicating completion of the entry, as shown in FIG. 5G(6). The word "hello" would be displayed in the text entry box 480 text entry box 480 upon detection of the entry completion input. As noted above, the preview pane 470 may allow the user to preview the text entries as entry of individual characters is detected, and before completion and entry into the text entry box 480. As noted above, the list 460 of suggested entries may be displayed to the user as the user implements the entries as described above, allowing the user to select one of the suggested entries displayed in the list 460. As noted above, the list 460 of suggested entries may be displayed before the user has manually completed an entry, based on, for example, an analysis of the input/swipe pattern to that point, comparison to stored patterns, an analysis of the entries preceding the current entry, historical usage and patterns associated with a particular user, and the like and corresponding prediction of a likely entry. In some implementations, the suggested entry having the highest probability of matching the user's swipe entry in progress may be listed first, and/or an appearance of the suggested entry having the highest probability may be altered (highlighted, bolded, underlined, and the like), to provide a visual indication to the user. Based on this visual indication the user may implement an action to cause the suggested entry (having the highest probability) to be entered in the text entry box 480, without actually completing the manual entry of characters.

In the example implementation shown in FIGS. 7A-7E, characters/text may be entered based on an eye gaze detection, together with a touch and hold input applied to the touch surface 108 of the controller, to detect and set an initial character of the intended entry, and then continuous eye swipes along the virtual keyboard 450 to enter subsequent character(s) while the touch is maintained on the touch surface 108 of the controller 102.

Figure 8:
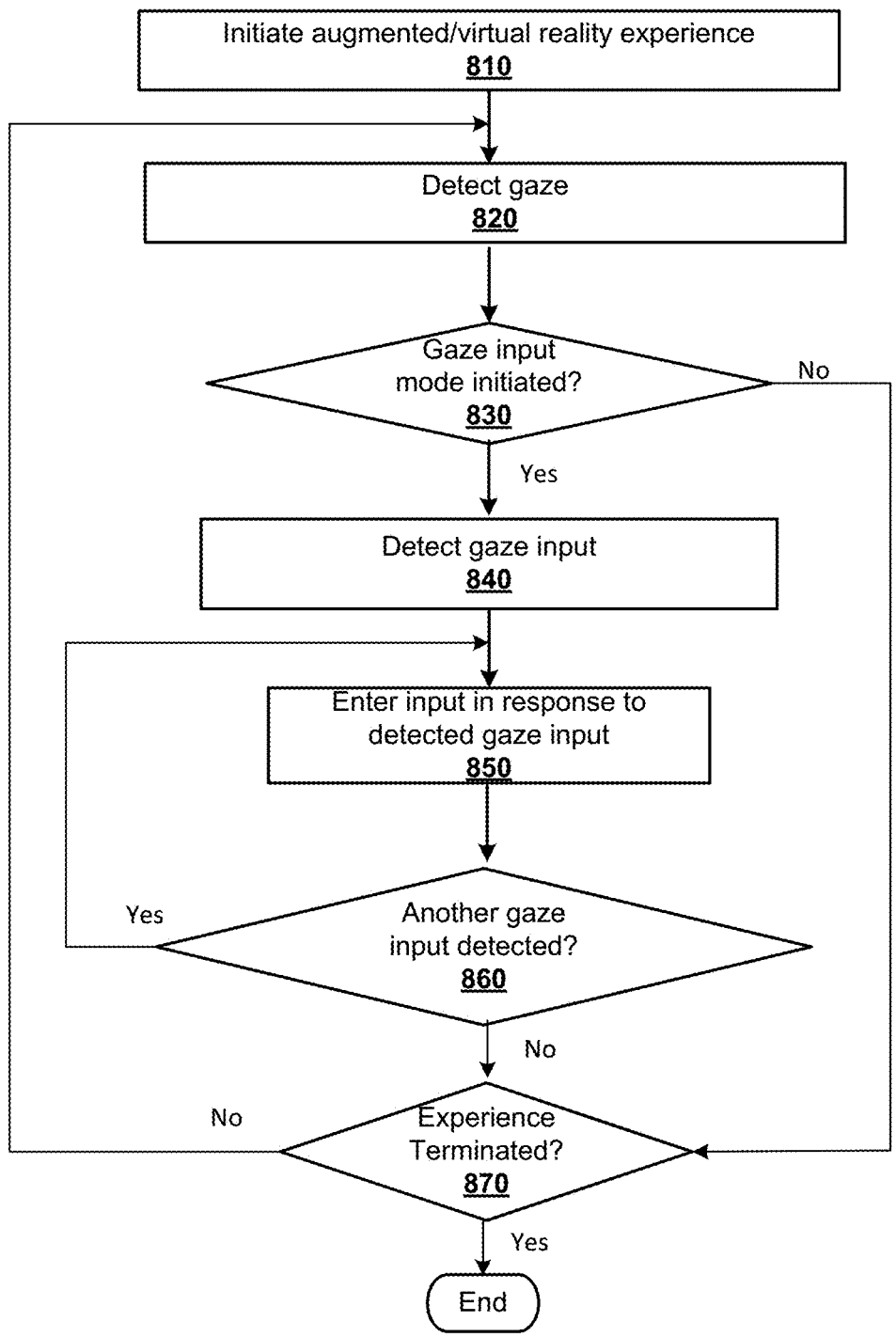
FIG. 8 is a flowchart of a method of combining eye gaze input and touch surface input for user interfaces in an augmented and/or virtual reality environment, in accordance with implementations as described herein.

A method 800 of combining gaze input and touch input for interaction with user interfaces in an augmented and/or virtual reality environment, in accordance with implementations as described herein, is shown in FIG. 8.

A user may initiate an augmented reality experience and/or a virtual reality experience using, for example, a computing device such as, for example, a system including a head mounted display device as described above, to generate the augmented reality and/or virtual reality environment (block 810), and the system may detect and track the user's gaze direction and gaze movement (block 820), such as, for example, an eye gaze direction and eye gaze movement, using, for example, a gaze tracking device 165 in an HMD 100 as described above. The system may determine if a gaze input mode has been initiated by the user (block 830). Initiation of the gaze input mode may be detected in response to, for example, a combination of a gaze directed at a particular virtual object or element combined with a user input via the controller, as described above in detail with respect to FIGS. 5A-5F, 6A-6F, and 7A-7E. In the gaze mode, the system may detect and enter gaze inputs, for example, eye gaze inputs (blocks 840 and 850), including gaze inputs in combination with inputs via the controller, as described above in detail with respect to FIGS. 5A-5F, 6A-6F, and 7A-7E, until no more gaze inputs are detected (block 860). The process may continue until it is determined that the current augmented reality and/or virtual reality experience has been terminated (block 870).

In a system and method, in accordance with implementations described herein, an optical tracking device may detect and track the user's eye gaze direction and movement, and/or sensors in an HMD may track the user's head gaze direction and movement, relative to virtual user interfaces displayed by the system in the virtual environment. A processor may process the detected gaze direction and/or movement as a user input, and may translate the user input into a corresponding interaction in the virtual environment. In some implementations, gaze directed swipes on a virtual keyboard displayed by the system in the virtual environment may be detected and tracked, and translated into a corresponding text input, either alone or together with user input(s) received by the controller, as described above with respect to FIGS. 4A-7E. In some implementations, the user may also interact with other types of virtual interfaces displayed by the system in the virtual environment using gaze direction and movement to provide an input, as described above, either alone or together with a controller input.

For example, the gaze of a user engaged in a virtual reality environment 900 may be directed at a particular virtual object 920 or area in the virtual environment 900, as shown in FIG. 9A. To inform the user of, for example, a incoming call or message arriving while the user is engaged in the virtual environment 900, the system may display a message box 980, as shown in FIG. 9B, giving the user the option to, for example, temporarily disengage from the virtual environment 900 and check the incoming call or message, or remain engaged in the virtual environment 900 and ignore the incoming call or message. In the example shown in FIG. 9B, the message box 980 is displayed in a translucent or substantially transparent state, so as to minimize obstruction of the elements and objects in the virtual environment and minimize user distraction.

If the user wishes to ignore the incoming call or message, the user may simply ignore the message box 980 and the system may simply delete the message box 980 after a set amount of time has elapsed without the user directing a gaze toward the message box 980 or otherwise interacting with the message box 980. If the user wishes to obtain more information related to the incoming call or message, the user may direct a gaze toward the message box 980, as shown in FIG. 9C. This may cause the message box 980 to expand to provide additional information, as shown in FIG. 9D. In this example, the expanded message box 980 is no longer transparent, and indicates a sender of an incoming message.

The message box 980 shown in FIG. 9C may be expanded as shown in FIG. 9D in response to, for example, a user gaze directed at the message box 980 shown in FIG. 9C for greater than a preset amount of time, or a gaze directed at the message box 980 followed by a blink, or a gaze directed at the message box 980, in combination with an input received via the controller 102 and/or the HMD 100, and the like. The message box 980 may be further expanded, as shown in FIG. 9E, to provide additional information associated with the incoming message, in a similar manner.

Figure 9F:
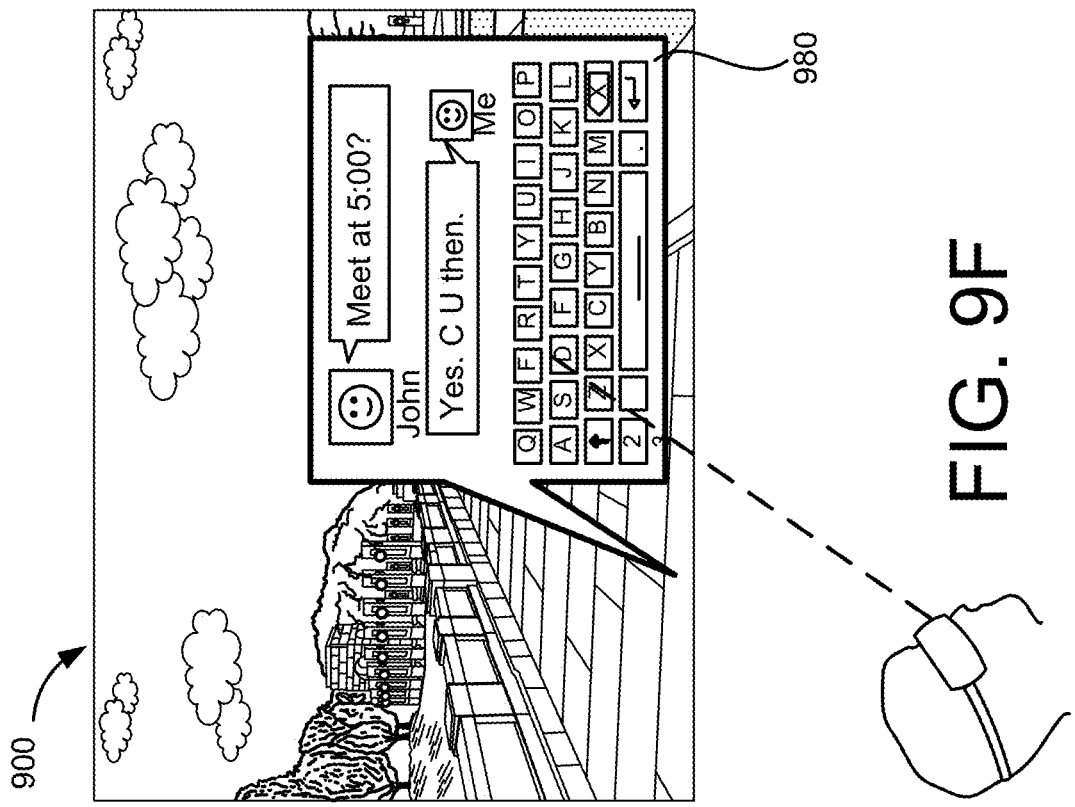
Figure 9E:
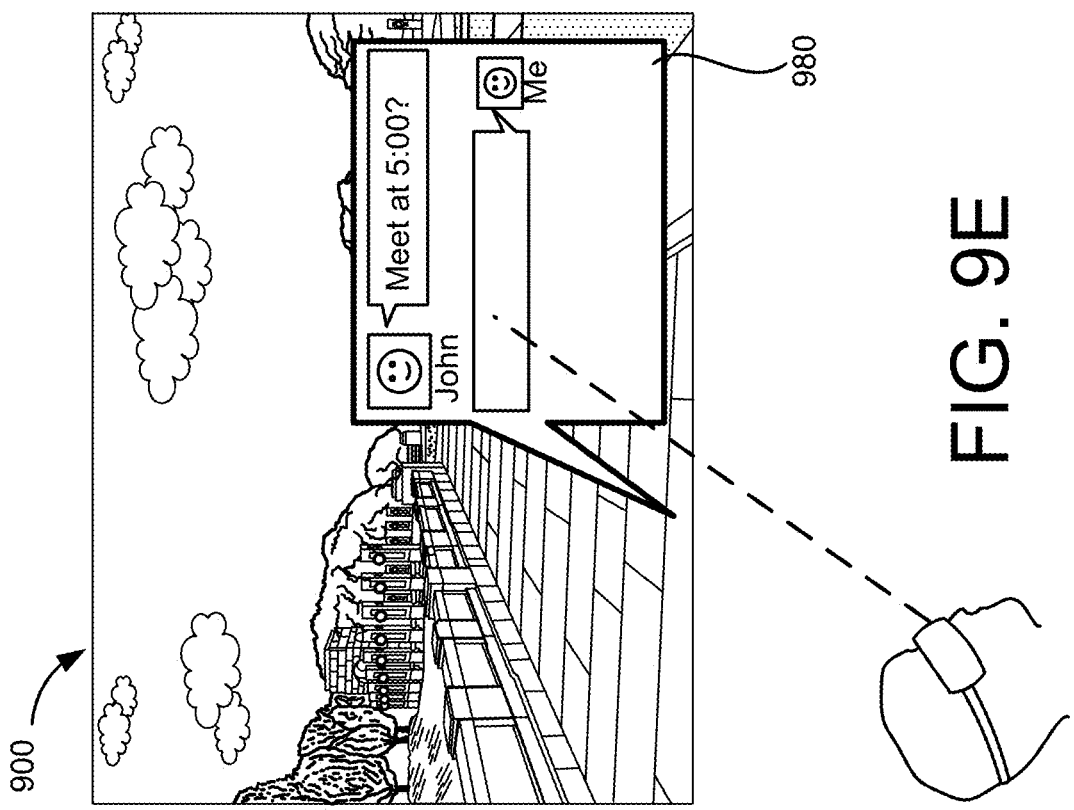
Figure 9G:
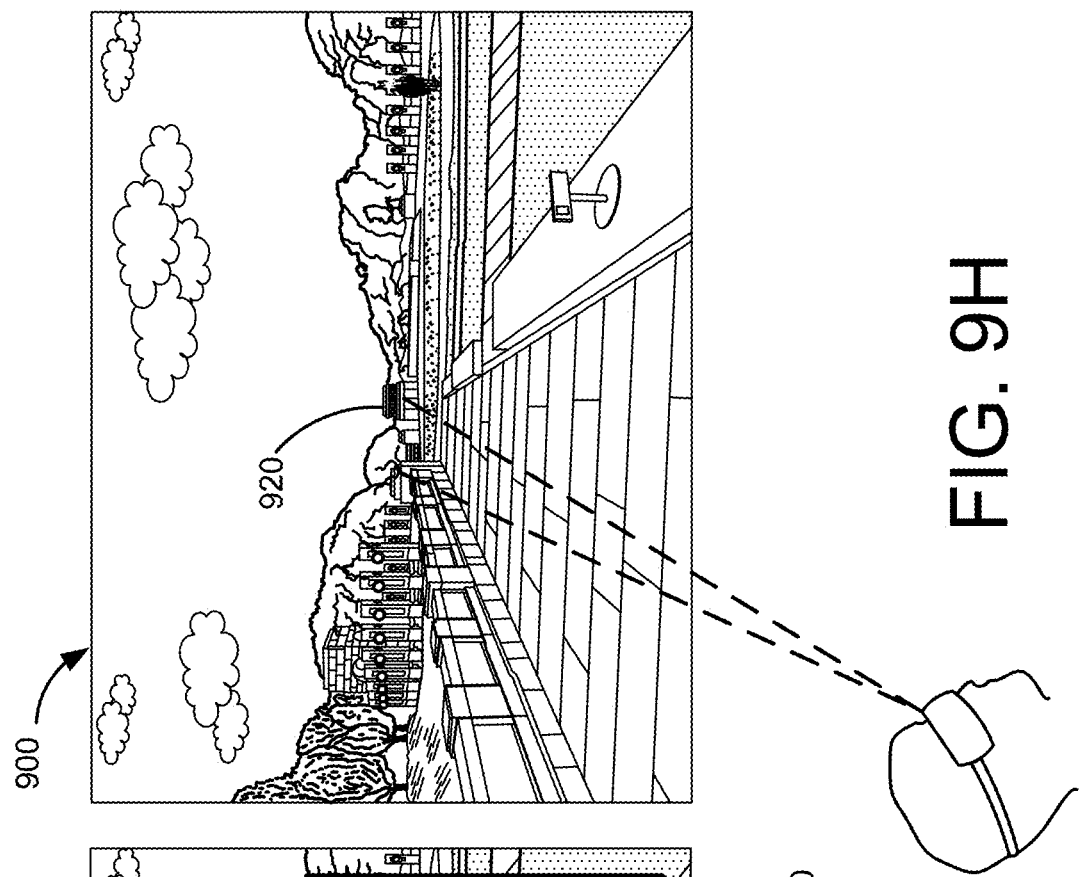
Figure 9H:
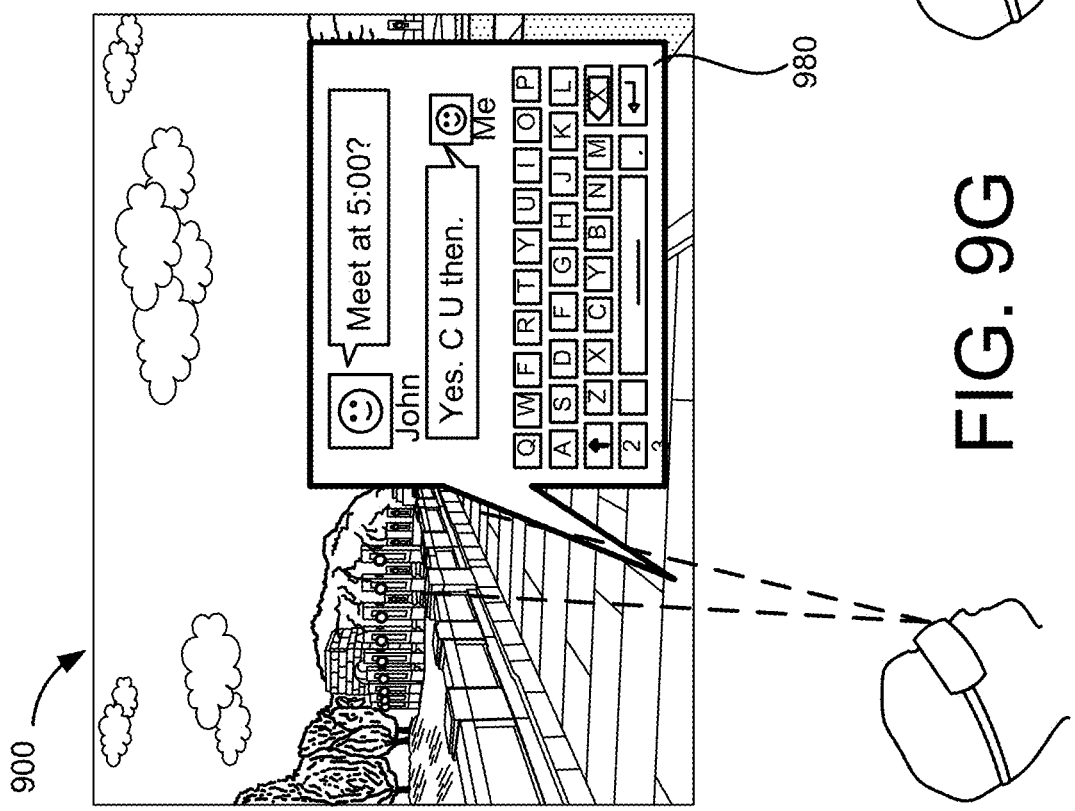

After viewing the message shown in FIG. 9E, the user may choose to respond to the message, as shown in FIG. 9F. In some implementations, a response may be entered as described in detail above with respect to FIGS. 5A-5F, 6A-6F, and 7A-7E. After viewing the message shown in FIG. 9E, the user may choose not to respond by, for example, directing a gaze outside of the message box 980, a manipulation of the controller 102, a manipulation of the HMD 100, and the like. Upon completing and sending the response, the user may direct a gaze outside of the message box 980, as shown in FIG. 9G, to return to and re-engage in the virtual environment 900, as shown in FIG. 9H.

In some implementations, the user's gaze direction and movement, for example eye gaze direction and eye gaze movement, may be tracked as the user scans the displayed content. For example, in tracking the user's eye gaze, the system may determine, based on the movement of the user's eye gaze, that the user has scanned a line, or lines, of text in the message box 980, and has finished reading the message to be conveyed. Determination that the user has finished reading the message may trigger another action, such as, for example, closing the message box 980, opening another dialog box and the like.

The features discussed above with respect to FIGS. 9A-9G are described with respect to an incoming call or message, simply for ease of discussion and illustration. However, similar principles and features may be applied to other interactions in an augmented and/or virtual reality environment, particularly when interacting via menus, lists and the like.

Figure 10:
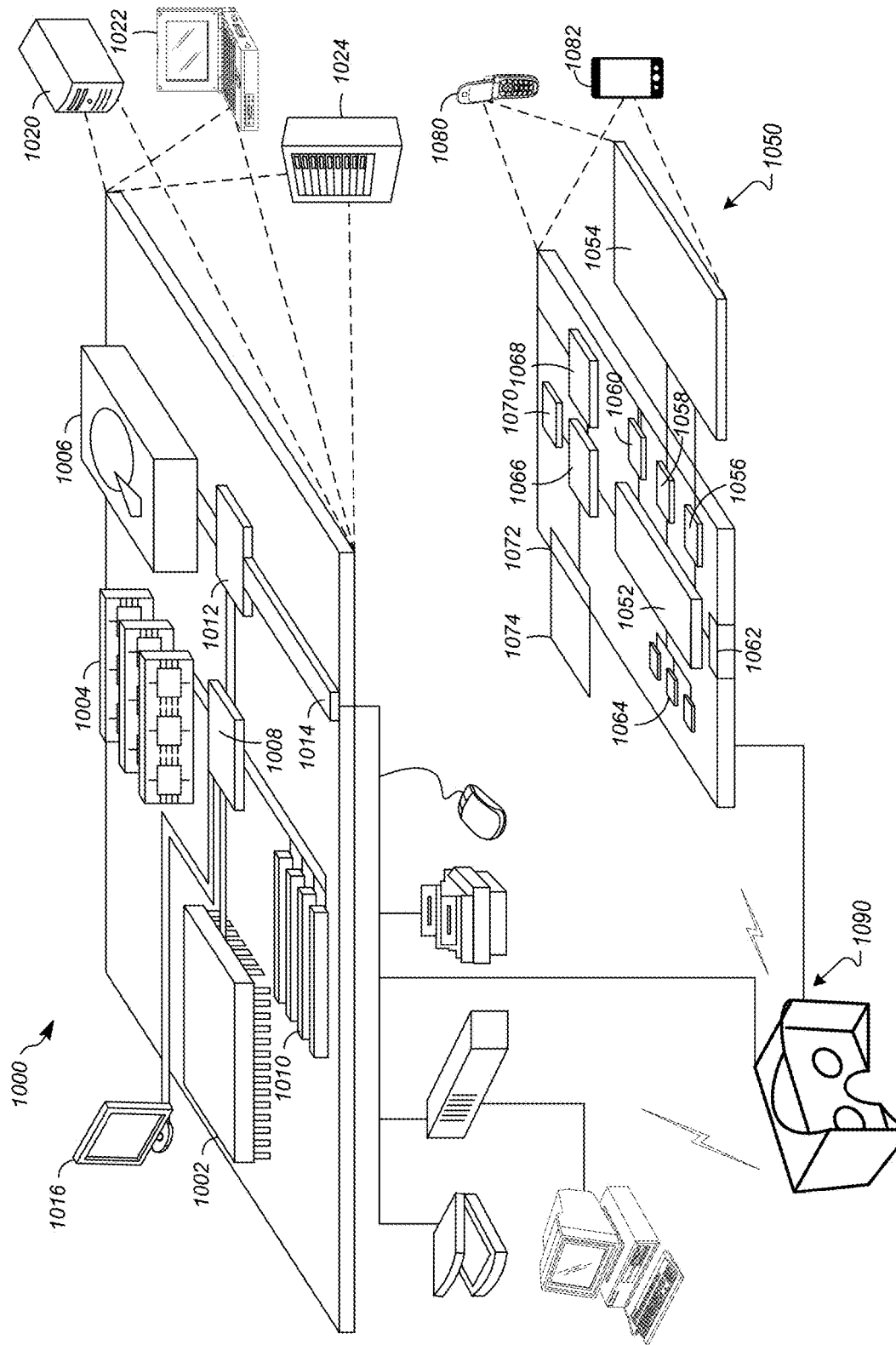
FIG. 10 shows an example of a computer device and a mobile computer device that can be used to implement the techniques described herein.

FIG. 10 shows an example of a computer device 1000 and a mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 10 can include sensors that interface with a virtual reality (VR headset/HMD device 1090). For example, one or more sensors included on a computing device 1050 or other computing device depicted in FIG. 10, can provide input to VR headset 1090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the VR space that can then be used as input to the VR space. For example, the computing device 1050 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the VR space can cause a particular action to occur in the VR space.

In some implementations, a touchscreen of the computing device 1050 can be rendered as a touchpad in VR space. A user can interact with the touchscreen of the computing device 1050. The interactions are rendered, in VR headset 1090 for example, as movements on the rendered touchpad in the VR space. The rendered movements can control virtual objects in the VR space.

In some implementations, one or more output devices included on the computing device 1050 can provide output and/or feedback to a user of the VR headset 1090 in the VR space. The output and/or feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the VR space. In the example of the laser pointer in a VR space, the computing device 1050 appears as a virtual laser pointer in the computer-generated, 3D environment. As the user manipulates the computing device 1050, the user in the VR space sees movement of the laser pointer. The user receives feedback from interactions with the computing device 1050 in the VR environment on the computing device 1050 or on the VR headset 1090.

In some implementations, a computing device 1050 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method, comprising:
   displaying, in a virtual reality environment, a virtual keyboard;
   detecting, by an optical sensor of a head mounted display device, an initial eye gaze directed at an initial key of a plurality of keys of the virtual keyboard;
   receiving, by the head mounted display device, an initial input, the initial input corresponding to a manipulation of a controller that is operably coupled to the head mounted display device;
   initializing an eye gaze input mode in response to the initial input from the controller and the detection of the initial eye gaze;
   receiving at least one character input in response to at least one of
   a detected eye gaze input, or
   a detected manipulation of the controller; and
   displaying, in the virtual reality environment, a character entry in response to the received at least one character input.

2. The method of claim 1, wherein receiving the initial input corresponding to the manipulation of the controller includes receiving the initial input corresponding to at least one of:
   detecting a touch input on a touch surface of the controller,
   detecting a manipulation of a button or switch on the controller, or
   detecting a set movement of the controller.

3. The method of claim 2, wherein receiving the at least one character input includes receiving the at least one character input in response to the detected eye gaze input and the detected manipulation at the controller, including:
   detecting a touch and hold input on the touch surface of the controller;
   detecting an eye gaze gesture directed to the plurality of keys of the virtual keyboard while the touch and hold input is maintained on the touch surface of the controller; and
   displaying at least one character corresponding to at least one selected key in response to the detected touch and hold input and the detected eye gaze gesture.

4. The method of claim 2, wherein receiving the at least one character input includes:
   detecting an eye gaze directed to at least one key of the plurality of keys of the virtual keyboard;
   setting the at least one key, of the plurality of keys, to which the eye gaze is directed, as the selected at least one key;
   detecting a tap input on the touch surface of the controller, or a manipulation of the button or switch on the controller; and recording at least one character corresponding to the selected at least one key in response to the detected tap input or the detected manipulation of the button or switch on the controller.

5. The method of claim 4, wherein detecting the eye gaze directed to at least one key of the plurality of keys of the virtual keyboard includes:
   detecting an eye gaze gesture corresponding to a plurality of sequentially selected keys of the virtual keyboard, including:
      detecting an eye gaze directed to a selected key of the plurality of keys;
      detecting the tap input or the manipulation;
      recording a character corresponding to the selected key in response to the detected tap input or the detected manipulation; and
      repeating the detecting, detecting and recording until an entry completion input is received; and
   displaying a plurality of characters corresponding to the plurality of sequentially selected keys of the virtual keyboard in response to the detected entry completion input.

6. The method of claim 4, wherein
   detecting the eye gaze directed to at least one key of the plurality of keys of the virtual keyboard includes:
      detecting an eye gaze gesture corresponding to a single selected key of the plurality of keys of the virtual keyboard, and
   recording at least one character corresponding to the selected at least one key includes:
      displaying a single character corresponding to the selected single key in response to the detected tap input or the detected manipulation together with the detected eye gaze,
   the method further comprising repeating the detecting, detecting and displaying until receiving an entry completion input.

7. The method of claim 2, wherein receiving at least one character input includes:
   detecting an initial character corresponding to the initial key of the plurality of keys of the virtual keyboard, and detecting an initial point on the touch surface of the controller corresponding to the initial input on the touch surface of the controller;
   detecting a drag input on the touch surface of the controller, the drag input corresponding to a virtual swipe along the virtual keyboard;
   detecting a selected key of the plurality of keys corresponding to a terminal point of the drag input; and
   recording a character corresponding to the selected key at the terminal point of the drag input.

8. The method of claim 7, further comprising:
   repeating the detecting, detecting and recording until the touch and drag input is released; and
   displaying a plurality of characters in response to the release of the touch and drag input, the plurality of characters including the initial character followed sequentially by the recorded characters.

9. The method of claim 7, wherein recording a character corresponding to the selected key includes displaying the character corresponding to the selected key, the method further comprising repeating the detecting, detecting, and displaying until the touch and drag input is released.

10. The method of claim 2, wherein receiving at least one character input in response to at least one of a detected eye gaze input or a detected manipulation at the controller includes:
    detecting a sustained touch and hold input on the touch surface of the controller or a sustained depression of the manipulation device of the controller;
    detecting a physical gesture of the controller corresponding to a selection of at least one key of the plurality of keys of the virtual keyboard;
    recording at least one character corresponding to the selected at least one key in response to the detected sustained touch and hold input or sustained depression of the manipulation device, together with the detected physical gesture of the controller;
    repeating the detecting, detecting and recording until the touch and hold input on the touch surface of the controller is released, or until the depression of the manipulation device of the controller is released; and
    displaying the recorded at least one character in response to the detected release of the touch and hold input, or the detected release of the depression of the manipulation device.

11. The method of claim 3, wherein detecting the eye gaze gesture includes:
    detecting the eye gaze gesture corresponding to a plurality of sequentially selected keys of the virtual keyboard;
    detecting a release of the touch and hold input; and
    displaying a plurality of characters corresponding to the plurality of sequentially selected keys of the virtual keyboard in response to the detected release of the touch and hold input.

12. The method of claim 11, wherein displaying the plurality of characters corresponding to the plurality of sequentially selected keys of the virtual keyboard in response to the detected release of the touch and hold input includes:
    displaying all of the plurality of characters simultaneously in response to the detected release of the touch and hold input.

13. The method of claim 3, wherein
    detecting the eye gaze gesture includes detecting the eye gaze gesture corresponding to a single selected key of the plurality of keys of the virtual keyboard, and
    displaying at least one character includes displaying a single character corresponding to the single selected key of the plurality of keys of the virtual keyboard,
    the method further comprises repeating the detecting, detecting and displaying until the touch and hold input on the touch surface of the controller is released.

14. The method of claim 3, wherein displaying the at least one character corresponding to the at least one selected key includes:
    detecting at least one of
       a sustained eye gaze, directed at a key of the plurality of keys, sustained for greater than a threshold amount of time, or
       a change in gaze direction, detected at the key of the plurality of keys, greater than a threshold magnitude; and
       displaying the character corresponding to the key, of the plurality of keys, in response to the detected sustained eye gaze or the detected change in gaze direction.

15. A computer program product embodied on a non-transitory computer readable medium, the computer readable medium having stored thereon a sequence of instructions which, when executed by a processor, causes the processor to execute a method, the method comprising:
    displaying, in a virtual reality environment, a virtual keyboard;

detecting, by an optical sensor of a head mounted display device, an initial eye gaze directed at an initial key of a plurality of keys of the virtual keyboard;

receiving, by the head mounted display device, an initial input, the initial input corresponding to a manipulation of a controller that is operably coupled to the head mounted display device;

initializing an eye gaze input mode in response to the initial input from the controller and the detection of the initial eye gaze;

receiving at least one character input in response to at least one of:
- a detected eye gaze input, or
- a detected manipulation of the controller; and displaying, in the virtual reality environment, a character entry in response to the received at least one character input.

16. The computer program product embodied on a non-transitory computer readable medium of claim 15, wherein receiving the at least one character input includes receiving the at least one character input in response to the detected eye gaze input and detected manipulation of the controller, including:

detecting a touch and hold input on the touch surface of the controller;

detecting an eye gaze gesture corresponding to at least one selected key of the plurality of keys of the virtual keyboard;

recording at least one character corresponding to the at least one selected key, in response to the detected touch and hold input and the detected eye gaze gesture;

repeating the detecting, detecting and recording until a release of the touch and hold input on the touch surface of the controller is detected; and displaying a plurality of characters corresponding to a plurality of sequentially selected keys of the virtual keyboard, based on the detected eye gaze gesture, in response to the detected release of the touch and hold input.

17. The computer program product embodied on a non-transitory computer readable medium 15, wherein receiving the at least one character input includes receiving the at least one character input in response to the detected eye gaze input and the detected manipulation at the external device, including:

detecting an eye gaze gesture corresponding to a plurality of sequentially selected keys of the virtual keyboard, including:

detecting an eye gaze directed to a selected key of the plurality of keys;

detecting the manipulation of the external device, including detecting a tap input on the touch surface of the controller, or a manipulation of a button or switch on the controller;

recording a character corresponding to the selected key in response to the detected tap input or the detected manipulation;

repeating the detecting, detecting and recording until an entry completion input is received; and displaying a plurality of characters corresponding to a plurality of sequentially selected keys of the virtual keyboard in response to the detected entry completion input.

18. The computer program product embodied on a non-transitory computer readable medium of claim 15, wherein receiving the at least one character input includes receiving the at least one character input in response to the detected eye gaze input and detected manipulation at the controller, including:

detecting the manipulation at the controller, including detecting a sustained touch and hold input on a touch surface of the controller, or detecting a sustained depression of a manipulation device of the controller;

detecting a physical gesture of the controller, the detected physical gesture corresponding to a selection of a selected key of the plurality of keys of the virtual keyboard;

recording a character corresponding to the selected key in response to the detected sustained touch and hold input or the detected sustained depression of the manipulation device, together with the detected physical gesture of the controller;

repeating the detecting, detecting and recording until the touch and hold input on the touch surface of the controller is released, or until the depression of the manipulation device of the controller is released; and displaying the recorded characters in response to the detected release of the touch and hold input or the detected release of the depression of the manipulation device.

19. The computer program product embodied on a non-transitory computer readable medium 16, wherein recording at least one character corresponding to the at least one selected key includes:

detecting at least one of
- a sustained eye gaze, directed at a key of the plurality of keys, sustained for greater than a threshold amount of time, or
- a change in gaze direction, detected at the key of the plurality of keys, greater than a threshold magnitude; and displaying the character corresponding to the key, of the plurality of keys, based on the detected sustained eye gaze or the detected change in gaze direction.

* * * * *

UNITED STATES PATENT AND TRADEMARK OFFICE
CERTIFICATE OF CORRECTION

PATENT NO. : 10,275,023 B2
APPLICATION NO. : 15/386594
DATED : April 30, 2019
INVENTOR(S) : McKenzie et al.

Page 1 of 1

It is certified that error appears in the above-identified patent and that said Letters Patent is hereby corrected as shown below:

In the Claims

Column 23, Claim 17, Line 40, delete "medium" and insert -- medium of claim --, therefor.

Column 24, Claim 19, Line 39, delete "medium" and insert -- medium of claim --, therefor.

Signed and Sealed this
Eighth Day of October, 2019

Andrei Iancu
*Director of the United States Patent and Trademark Office*